US012547060B2

(12) United States Patent
Sano

(10) Patent No.: US 12,547,060 B2
(45) Date of Patent: Feb. 10, 2026

(54) PROJECTOR WITH MOVING DEVICE THAT MOVES PROJECTION OPTICAL DEVICE

(71) Applicant: SEIKO EPSON CORPORATION, Tokyo (JP)

(72) Inventor: Tetsushi Sano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 543 days.

(21) Appl. No.: 18/088,056

(22) Filed: Dec. 23, 2022

(65) Prior Publication Data
US 2023/0205064 A1    Jun. 29, 2023

(30) Foreign Application Priority Data
Dec. 24, 2021    (JP) .................................. 2021-211572

(51) Int. Cl.
*G03B 21/14*    (2006.01)
*G02B 7/10*    (2021.01)

(52) U.S. Cl.
CPC ............. *G03B 21/142* (2013.01); *G02B 7/10* (2013.01)

(58) Field of Classification Search
CPC ........ G03B 21/00; G03B 21/10; G03B 21/14; G03B 21/28; G03B 21/142; G03B 21/145; G02B 7/02; G02B 7/023; G02B 7/10
See application file for complete search history.

(56) References Cited

U.S. PATENT DOCUMENTS

| | | | |
|---|---|---|---|
| 8,632,191 B2 | 1/2014 | Wakabayashi | |
| 2009/0219505 A1 | 9/2009 | Kitahara et al. | |
| 2013/0308211 A1* | 11/2013 | Okada | G03B 3/10 |
| | | | 359/819 |
| 2018/0088449 A1* | 3/2018 | Hatano | G03B 21/147 |
| 2018/0307002 A1* | 10/2018 | Takehana | G02B 7/021 |
| 2019/0064641 A1* | 2/2019 | Fukuyama | G03B 21/145 |
| 2019/0129286 A1* | 5/2019 | Lin | G02B 27/0955 |

FOREIGN PATENT DOCUMENTS

| | | |
|---|---|---|
| JP | 2010-066784 A | 3/2010 |
| JP | 2012-008185 A | 1/2012 |
| JP | 2016-045262 A | 4/2016 |
| JP | 2018-185419 A | 11/2018 |

* cited by examiner

*Primary Examiner* — Sultan Chowdhury
(74) *Attorney, Agent, or Firm* — Oliff PLC

(57) ABSTRACT

A projector includes a projection optical device configured to project image light and a moving device configured to move the projection optical device in a first direction crossing an incident direction of the image light on the projection optical device. The moving device includes a holding member configured to hold the projection optical device and a supporting member configured to support the holding member to be movable in the first direction. The projection optical device includes a lens barrel configured to hold a lens and a flange provided in the lens barrel and held by the holding member. The supporting member includes guide surfaces that guide the movement of the holding member in the first direction. The holding member includes contact surfaces that are in contact with the guide surfaces. The guide surfaces and the contact surfaces cross the incident direction.

14 Claims, 17 Drawing Sheets

PROJECTOR WITH MOVING DEVICE THAT MOVES PROJECTION OPTICAL DEVICE

The present application is based on, and claims priority from JP Application Serial Number 2021-211572, filed Dec. 24, 2021, the disclosure of which is hereby incorporated by reference herein in its entirety.

BACKGROUND

1. Technical Field

The present disclosure relates to a projector.

2. Related Art

There has been known a projector including a projection optical device that projects image light onto a projection surface and an adjusting device capable of adjusting a projection position of the image light on the projection surface (see, for example, JP-A-2018-185419 (Patent Literature 1)).

In the projector described in Patent Literature 1, the adjusting device shifts the projection optical device in a direction crossing a center axis of the projection optical device to thereby adjust the projection position of the image light. The adjusting device includes a holding member, a supporting member, a moving member, and a driving device.

The holding member holds a held section, which is a flange section, of the projection optical device. The holding member includes four sliding surfaces provided at four corners in a rectangular front surface section and four insertion holes provided in each of the four sliding surfaces.

The supporting member supports the holding member to be movable in the crossing direction. The supporting member includes four supporting surfaces provided at the four corners of the rectangular front surface section and four bosses projecting from each of the four supporting surfaces and inserted into insertion holes corresponding to the bosses among the four insertion holes.

The moving member is provided in the supporting member and inserted into the holding member.

The driving device includes a dial that receives rotating operation of a user and a screw gear that rotates together with the dial and moves the moving member.

In such a projector, when the dial is rotated by the user, the moving member meshing with the screw gear moves the holding member in the crossing direction. At this time, since the sliding surfaces of the holding member are in contact with the supporting surfaces of the supporting member, the projection optical device is moved in the crossing direction along the supporting surfaces together with the holding member.

In recent years, there has been an increasing demand for a reduction in the size of a projector.

However, the projector described in Patent Literature 1 tends to be increased in size in the crossing direction in which the projection optical device is moved by the adjusting device.

Therefore, there has been demanded a configuration that can reduce the projector in size while including a component that moves the projection optical device.

SUMMARY

A projector according to an aspect of the present disclosure includes: a projection optical device configured to project image light; and a moving device configured to move the projection optical device in a first direction crossing an incident direction of the image light on the projection optical device. The moving device includes: a holding member configured to hold the projection optical device; and a supporting member configured to support the holding member to be movable in the first direction. The projection optical device includes: a lens barrel configured to hold a lens; and a flange provided in the lens barrel and held by the holding member. The supporting member includes guide surfaces that guide the movement of the holding member in the first direction. The holding member includes contact surfaces that are in contact with the guide surfaces. The guide surfaces and the contact surfaces cross the incident direction. When viewed from an emission side of the image light by the projection optical device, at least parts of the contact surfaces overlap the flange.

DESCRIPTION OF EXEMPLARY EMBODIMENTS

An embodiment of the present disclosure is explained below with reference to the drawings. Exterior configuration of a projector FIG. 1 is a perspective view showing a projector 1 according to this embodiment.

The projector 1 according to this embodiment is an image display device that modulates light emitted from a light source 31 provided on the inside to form image light corresponding to image information and enlarges and projects the formed image light on a projection surface such as a screen. As explained in detail below, the projector 1 has one characteristic in a configuration of a moving device 6 (see FIG. 3) capable of moving a projection optical device 5 that projects the image light and adjusting a projection position of the image light by the projection optical device 5.

Figure 1:
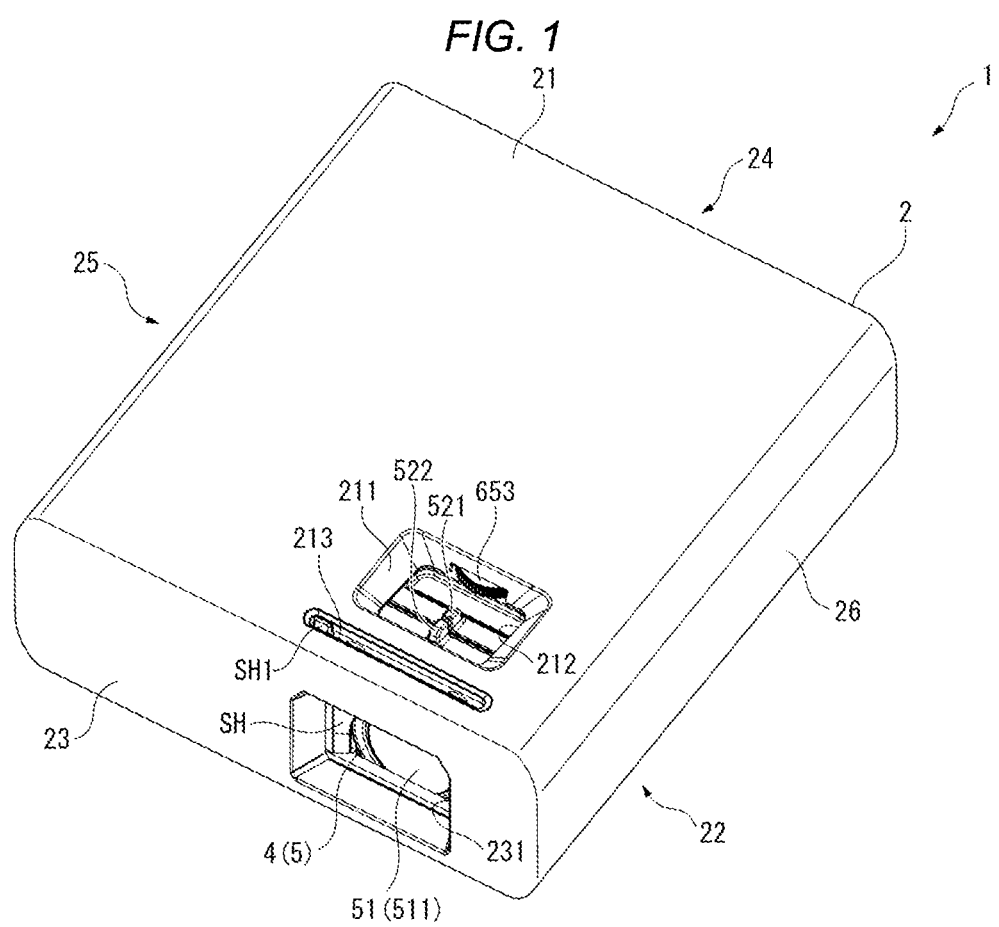
FIG. 1 is a perspective view showing a projector according to an embodiment.

The projector 1 includes, as shown in FIG. 1, an exterior housing 2 configuring the exterior of the projector 1.

Configuration of the Exterior Housing

The exterior housing 2 is formed in a substantially rectangular parallelepiped shape. The exterior housing 2 includes a top surface section 21, a bottom surface section 22, a front surface section 23, a rear surface section 24, a left side surface section 25, and a right side surface section 26.

The front surface section 23 includes an opening section 231 that exposes an emission side lens explained below of the projection optical device 5. The opening section 231 is opened and closed by a shutter SH provided on the inner side of the front surface section 23.

The top surface section 21 includes a recess 211 and opening sections 212 and 213.

The recess 211 is formed in a rectangular shape in a position on the front surface section 23 side in the top surface section 21.

The opening section 212 is provided in the bottom of the recess 211. Operation levers 521 and 522 for performing focus adjustment and zoom adjustment of an image projected by the projection optical device 5 are exposed via the opening section 212. Apart of a dial 653 configuring the moving device 6 explained below is exposed on the inner surface on the rear surface section 24 side in the recess 211.

The opening section 213 is formed along the front surface section 23 in a position further on the front surface section 23 side than the recess 211. An operation section SH1 of the shutter SH is disposed on the inside of the opening section 213. When the operation section SH1 is slid along the opening section 213, the shutter SH opens and closes the opening section 231.

Internal Configuration of the Projector

Figure 2:
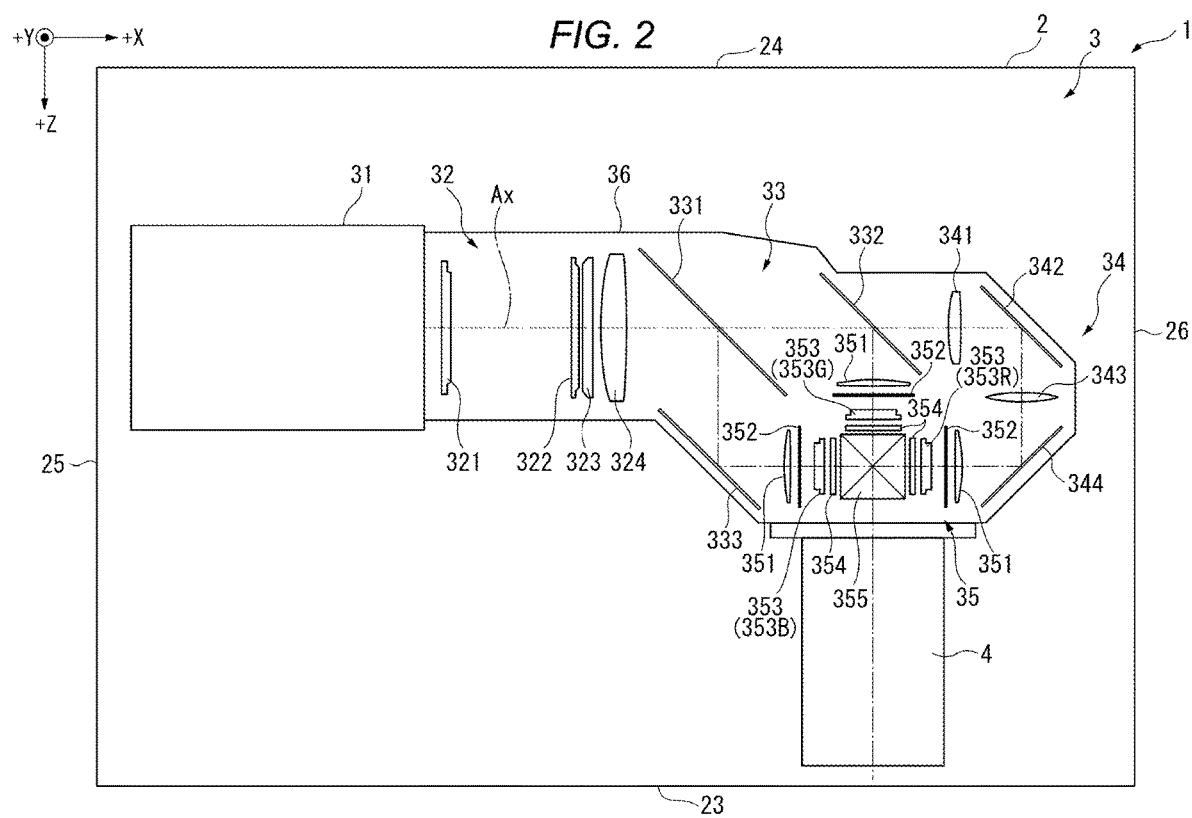
FIG. 2 is a schematic diagram showing the configuration of an image projection device according to the embodiment.

FIG. 2 is a schematic diagram showing the configuration of an image projection device 3.

The projector 1 includes, as shown in FIG. 2, the image projection device 3 housed in the exterior housing 2. Besides, although not illustrated, the projector 1 includes a control device that controls the operation of the projector 1, a power supply device that supplies electric power to electronic components configuring the projector 1, and a cooling device that cools cooling targets configuring the projector 1.

Configuration of the Image Projection Device

The image projection device 3 forms the image light corresponding to the image information input from the control device and projects the formed image light. The image projection device 3 includes the light source 31, a uniformizing section 32, a color separating section 33, a relay section 34, an image forming section 35, an optical component housing 36, and a projection optical unit 4.

The light source 31 emits illumination light to the uniformizing section 32. As the configuration of the light source 31, for example, a configuration including a solid-state light source that emits blue light, which is excitation light, and a wavelength conversion element that converts at least a part of the blue light emitted from the solid-state light source into fluorescent light including green light and red light can be illustrated. As another configuration of the light source 31, a configuration including a light source lamp such as an ultrahigh pressure mercury lamp or a configuration including light emitting elements that separately emit the blue light, the green light, and the red light can be illustrated.

The uniformizing section 32 uniformizes light emitted from the light source 31. The uniformized light illuminates modulation regions of light modulation devices 353 explained below through the color separating section 33 and the relay section 34. The uniformizing section 32 includes two lens arrays 321 and 322, a polarization conversion element 323, and a superimposing lens 324.

The color separating section 33 separates the light made incident from the uniformizing section 32 into color lights of red, green, and blue. The color separating section 33 includes two dichroic mirrors 331 and 332 and a reflection mirror 333 that reflects the blue light separated by the dichroic mirror 331.

The relay section 34 is provided in an optical path of the red light longer than optical paths of the other color lights and reduces a loss of the red light. The relay section 34 includes an incident side lens 341, a relay lens 343, and reflection mirrors 342 and 344. In this embodiment, the red light is guided to the relay section 34. However, not only this, but, for example, the color light having a longer optical path than the other color lights may be the blue light. The blue light may be guided to the relay section 34.

The image forming section 35 modulates the color lights of red, green, and blue made incident thereon and combines the modulated color lights to form the image light. The image forming section 35 includes three field lenses 351, three incident side polarization plates 352, three light modulation devices 353, and three emission side polarization plates 354 provided to correspond to the incident color lights and one color combining section 355.

The light modulation devices 353 modulate light emitted from the light source 31 based on an image signal input from the control device. Specifically, the light modulation devices 353 modulate light emitted from the incident side polarization plates 352 based on the input image signal and emit the modulated light as image light. The light modulation devices 353 include a light modulation device 353R for red light, a light modulation device 353G for green light, and light modulation device 353B for blue light. In this embodiment, the light modulation devices 353 are transmissive liquid crystal panels that emit the modulated light in a light incident direction. A liquid crystal light valve is configured by the incident side polarization plates 352, the light modulation devices 353, and the emission side polarization plates 354.

The color combining section 355 combines three color lights modulated by the light modulation devices 353B, 353G, and 353R to form the image light. The image light formed by the color combining section 355 is made incident on the projection optical unit 4. In this embodiment, the color combining section 355 is configured by a substantially rectangular parallelepiped cross dichroic prism. However, the color combining section 355 may be configured by a plurality of dichroic mirrors.

The optical component housing 36 houses the sections 32 to 35 explained above on the inside. An illumination optical axis Ax, which is an optical axis in design, is set in the image projection device 3. The optical component housing 36 holds the sections 32 to 35 in predetermined positions on the illumination optical axis Ax. The light source 31 and the projection optical unit 4 are disposed in predetermined positions on the illumination optical axis Ax.

Configuration of the Projection Optical Unit

Figure 3:
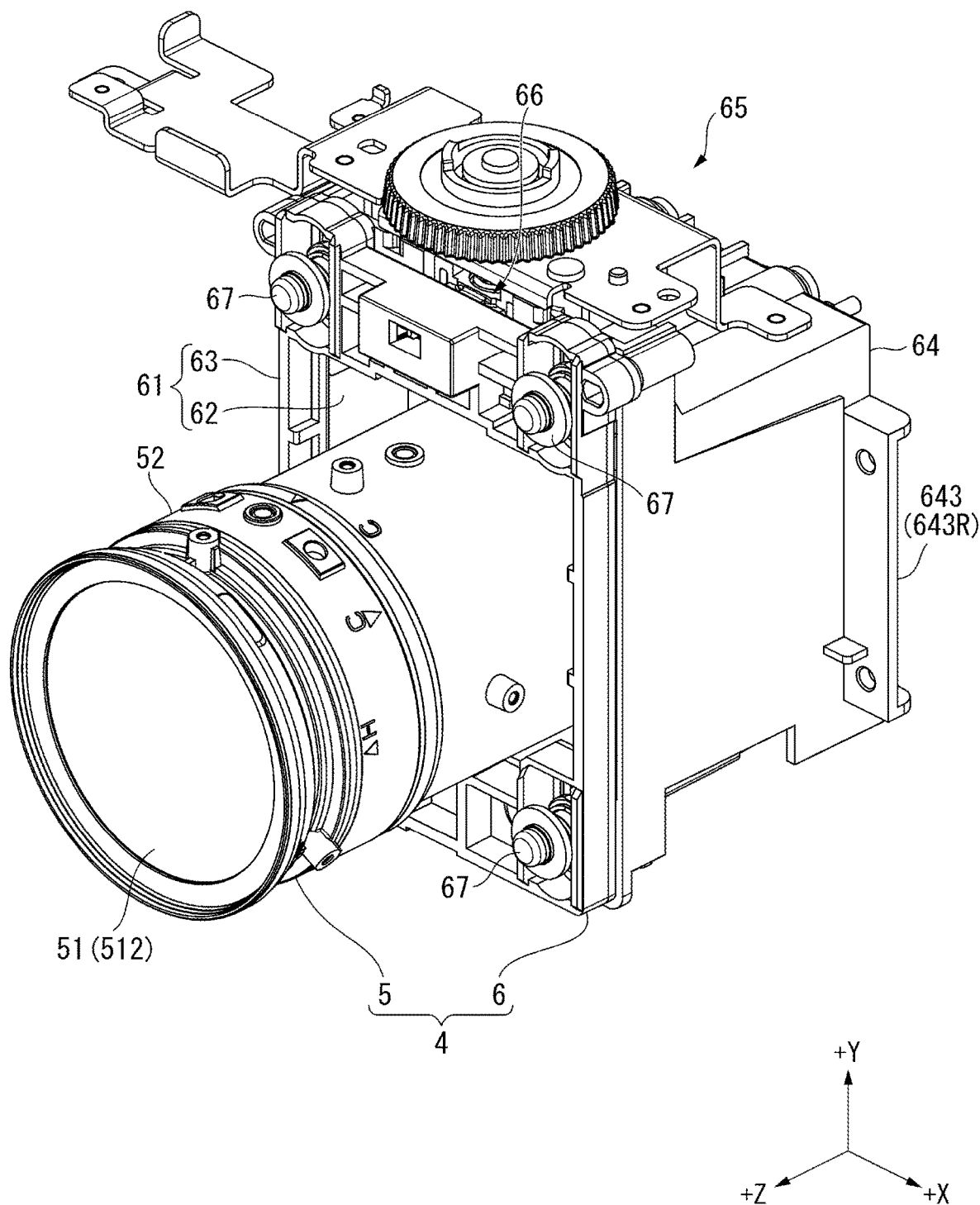
FIG. 3 is a perspective view showing a projection optical unit according to the embodiment.
Figure 4:
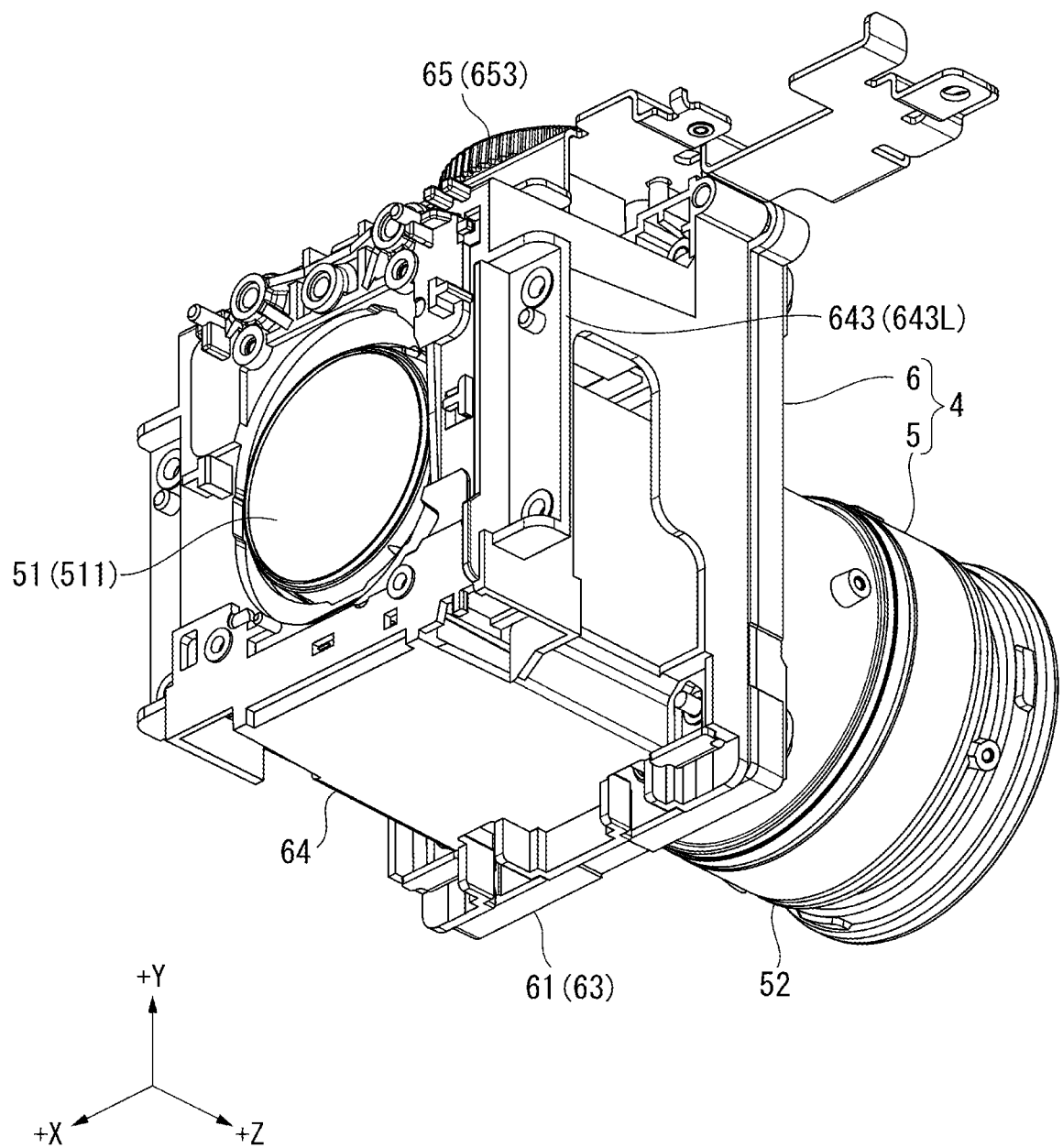
FIG. 4 is a perspective view showing the projection optical unit according to the embodiment.
Figure 5:
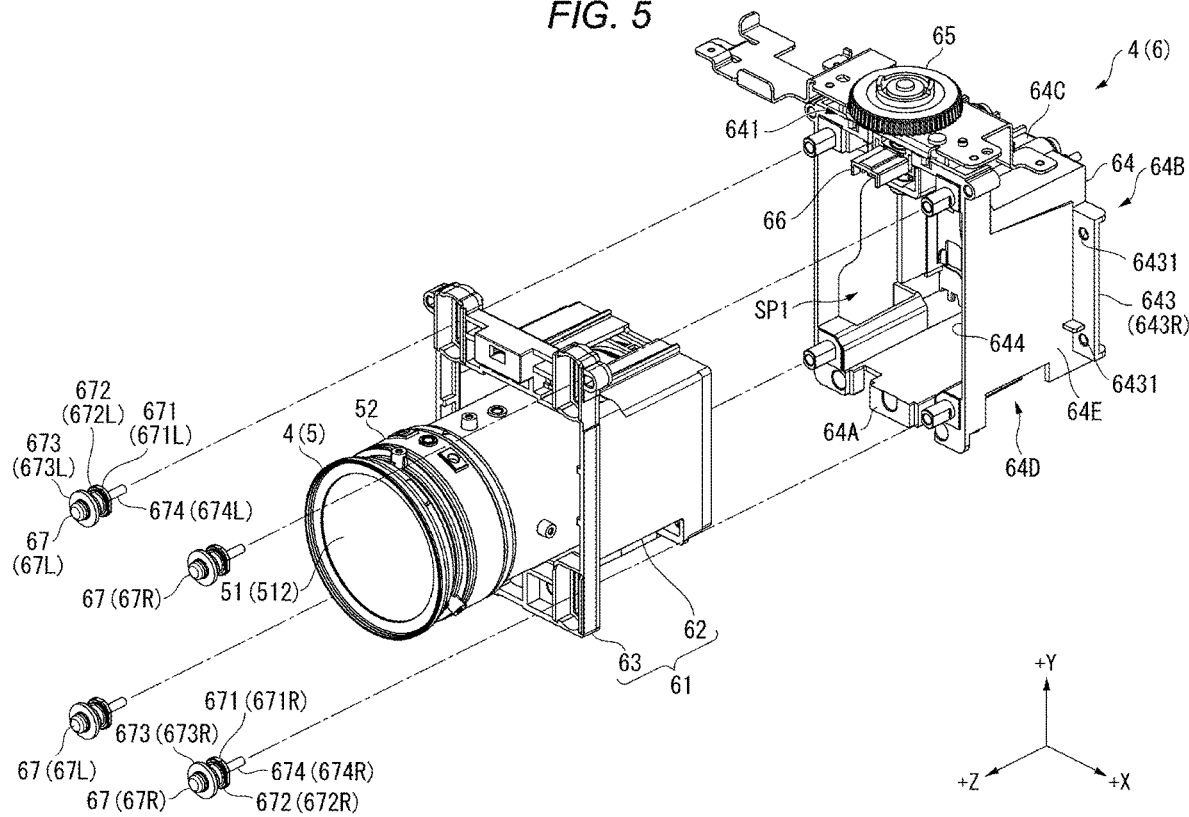
FIG. 5 is an exploded perspective view showing the projection optical unit according to the embodiment.
Figure 6:
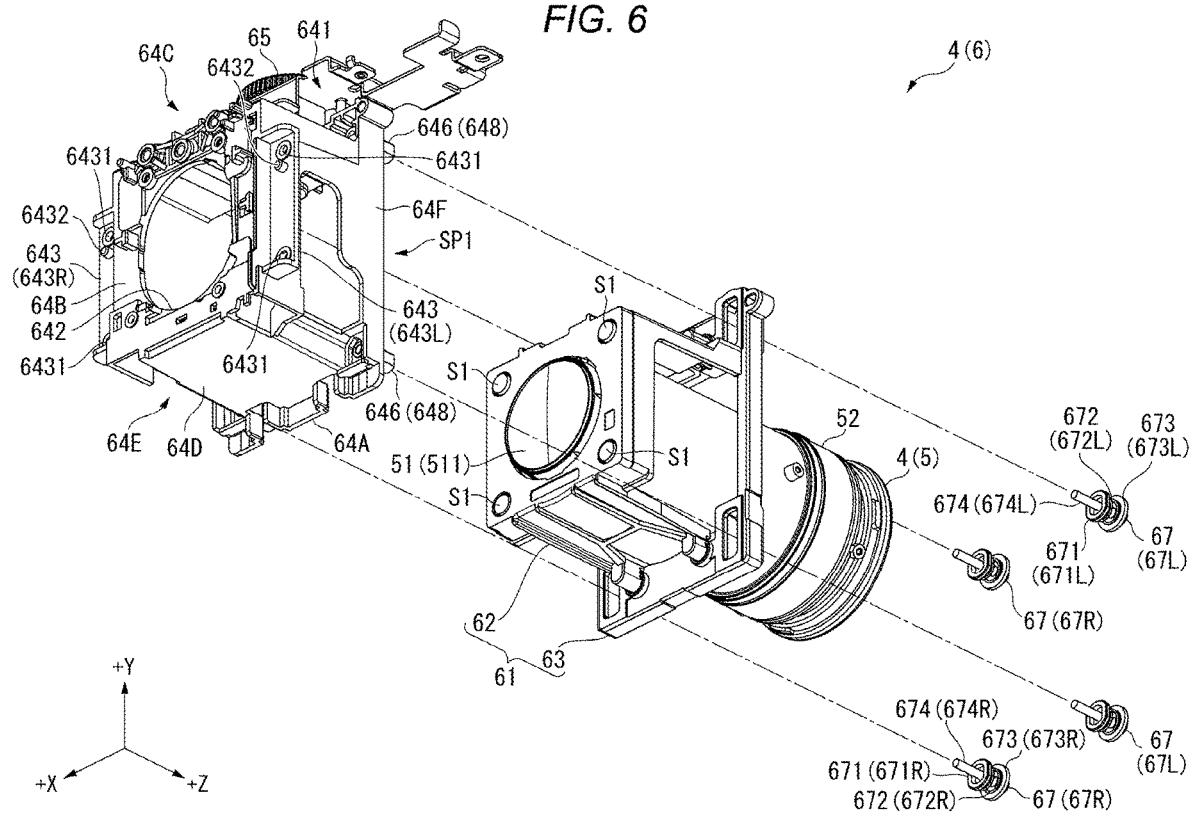
FIG. 6 is an exploded perspective view showing the projection optical unit according to the embodiment.

FIG. 3 is a perspective view of the projection optical unit 4 viewed from a projection side of the image light by the projection optical device 5. FIG. 4 is a perspective view of the projection optical unit 4 viewed from an incident side of the image light on the projection optical device 5. FIG. 5 is an exploded perspective view of the projection optical unit 4 viewed from the projection side of the image light by the projection optical device 5. FIG. 6 is an exploded perspective view of the projection optical unit 4 viewed from the incident side of the image light on the projection optical device 5.

The projection optical unit 4 projects the image light made incident from the image forming section 35 onto the projection surface. The projection optical unit 4 includes, as shown in FIGS. 3 to 6, the projection optical device 5 that projects the image light and the moving device 6 that moves the projection optical device 5 in a direction orthogonal to an incident direction of the image light on the projection optical device 5.

In the following explanation, three directions orthogonal to one another are represented as a +X direction, a +Y direction, and a +Z direction. The +Z direction is an incident direction of the image light on the projection optical device 5. The +Y direction is the upward direction in the case in which the projection optical unit 4 is viewed from the +Z direction. The +X direction is the right direction in the case in which the projection optical unit 4 is viewed from the +Z direction.

The opposite direction of the +X direction is represented as a −X direction, the opposite direction of the +Y direction is represented as a −Y direction, and the opposite direction of the +Z direction is represented as a −Z direction.

In this embodiment, the +Z direction coincides with an emitting direction of the image light by the projection optical device 5 when viewed from the +Y direction. A ±Y direction is a first direction crossing the incident direction of the image light on the projection optical device 5 (the +Z direction). A ±X direction is a second direction orthogonal to each of the incident direction of the image light on the projection optical device 5 (the +Z direction) and the first direction (the ±Y direction).

Configuration of the Projection Optical Device

Figure 7:
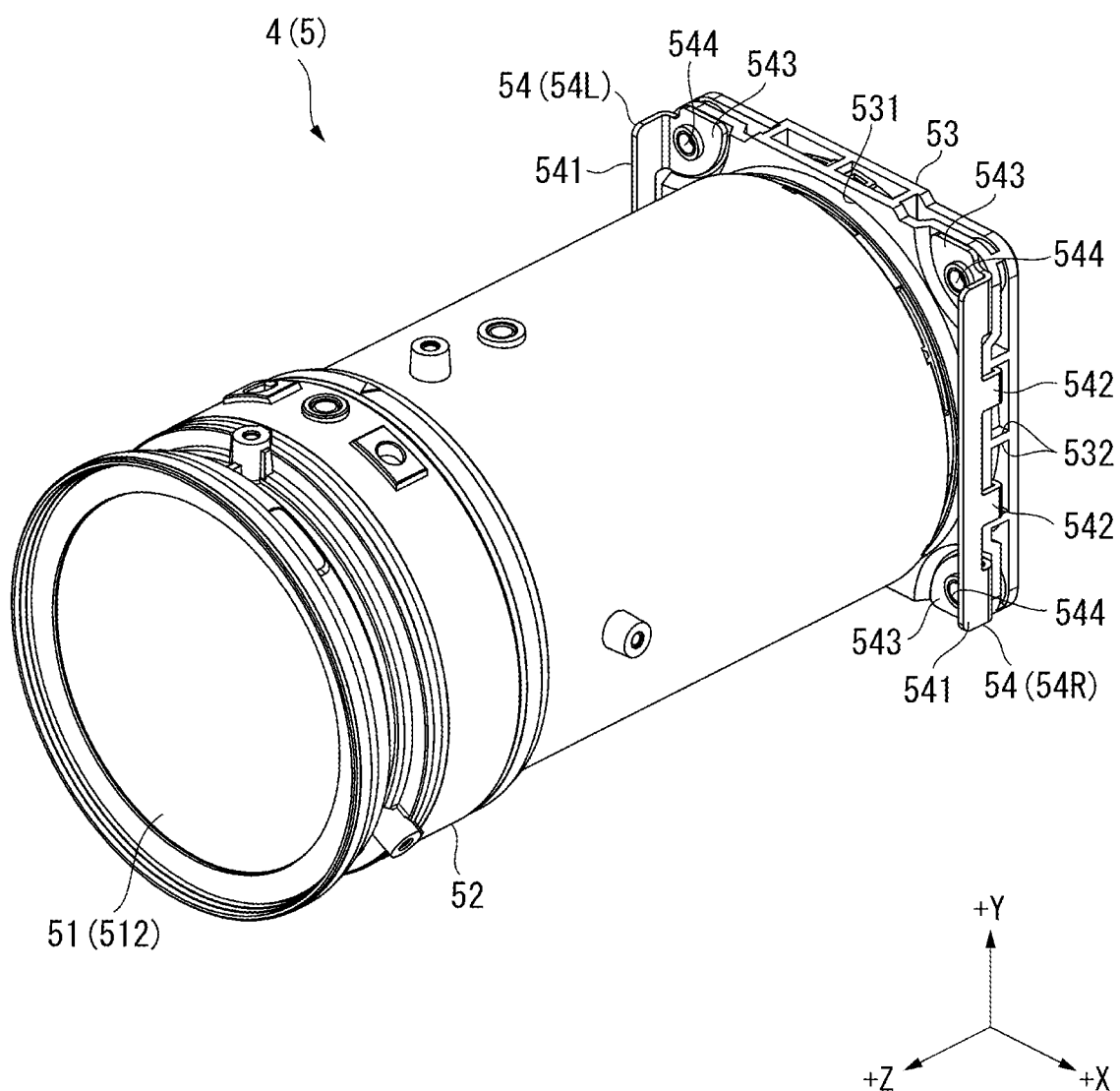
FIG. 7 is a perspective view showing a projection optical device according to the embodiment.
Figure 8:
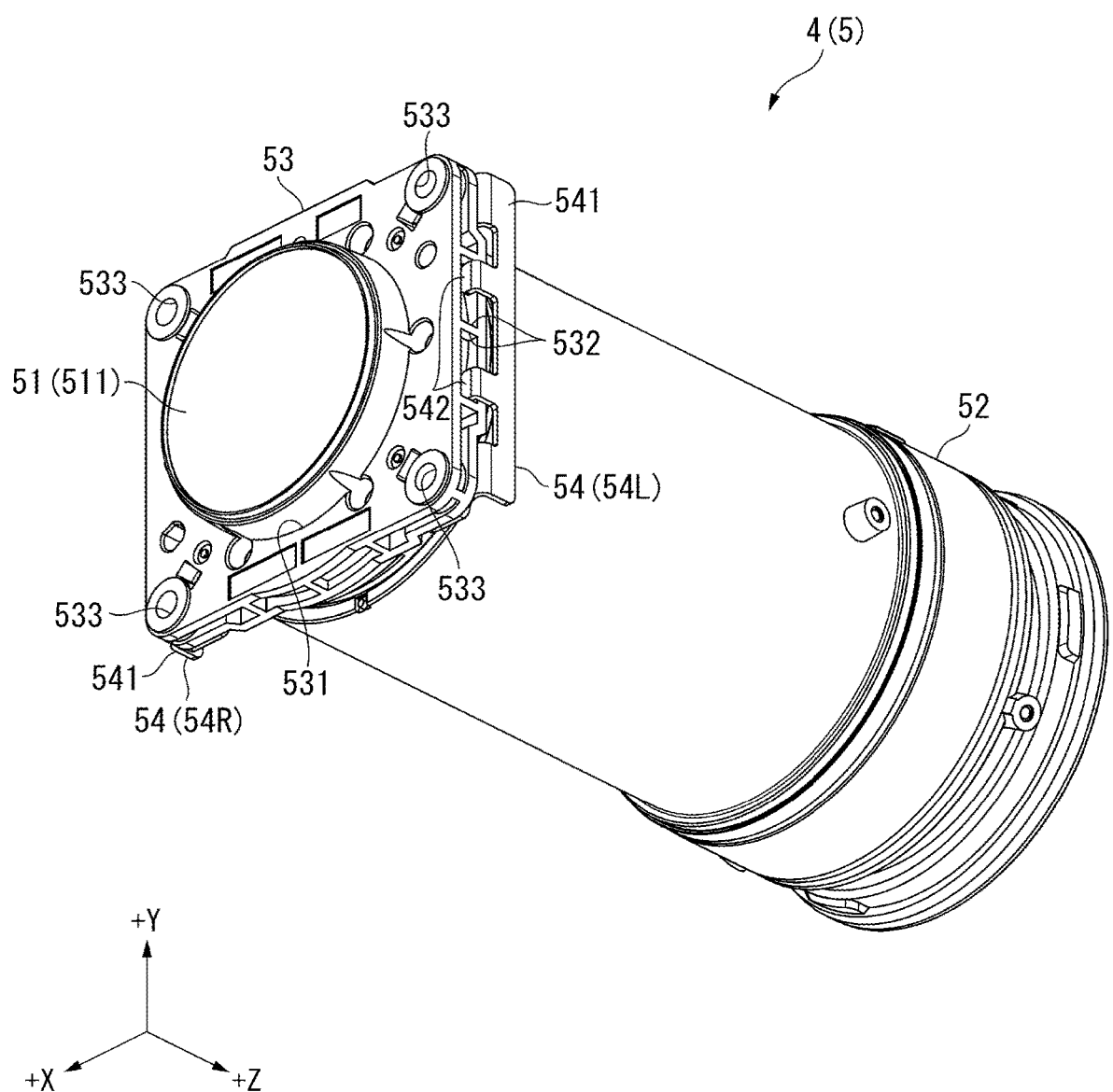
FIG. 8 is a perspective view showing the projection optical device according to the embodiment.

FIGS. 7 and 8 are perspective views showing the projection optical device 5. Specifically, FIG. 7 is a perspective view of the projection optical device 5 viewed from an emission side of the image light. FIG. 8 is a perspective view of the projection optical device 5 viewed from the incident side of the image light.

The projection optical device 5 is a projection lens that projects the image light formed by the image forming section 35. The projection optical device 5 includes, as shown in FIGS. 7 and 8, a plurality of lenses 51, a lens barrel 52, a flange 53, and two mounting members 54.

The plurality of lenses 51 include an incident side lens 511 shown in FIG. 8, an emission side lens 512 shown in FIG. 7, and a zoom lens and a focus lens not shown in the figures.

The incident side lens 511 is disposed closest to a light incident side of the image light (in the −Z direction) among the plurality of lenses 51. The image light is made incident on the incident side lens 511 from the image forming section 35.

The emission side lens 512 is disposed closest to a light emission side of the image light (in the +Z direction) among the plurality of lenses 51. The emission side lens 512 projects the image light having passed through the lens barrel 52.

Configuration of the Lens Barrel

As shown in FIGS. 7 and 8, the lens barrel 52 is formed in a substantially cylindrical shape and holds the plurality of lenses 51. Parts where the zoom lens and the focus lens are disposed in the lens barrel 52 can turn centering on a center axis extending in the +Z direction according to operation of a user on the operation levers 521 and 522 (see FIG. 1). Consequently, the zoom lens and the focus lens are moved in the +Z direction and a zoom state and a focus state of the image light projected onto the projection surface are adjusted.

Configuration of the Flange

Figure 9:
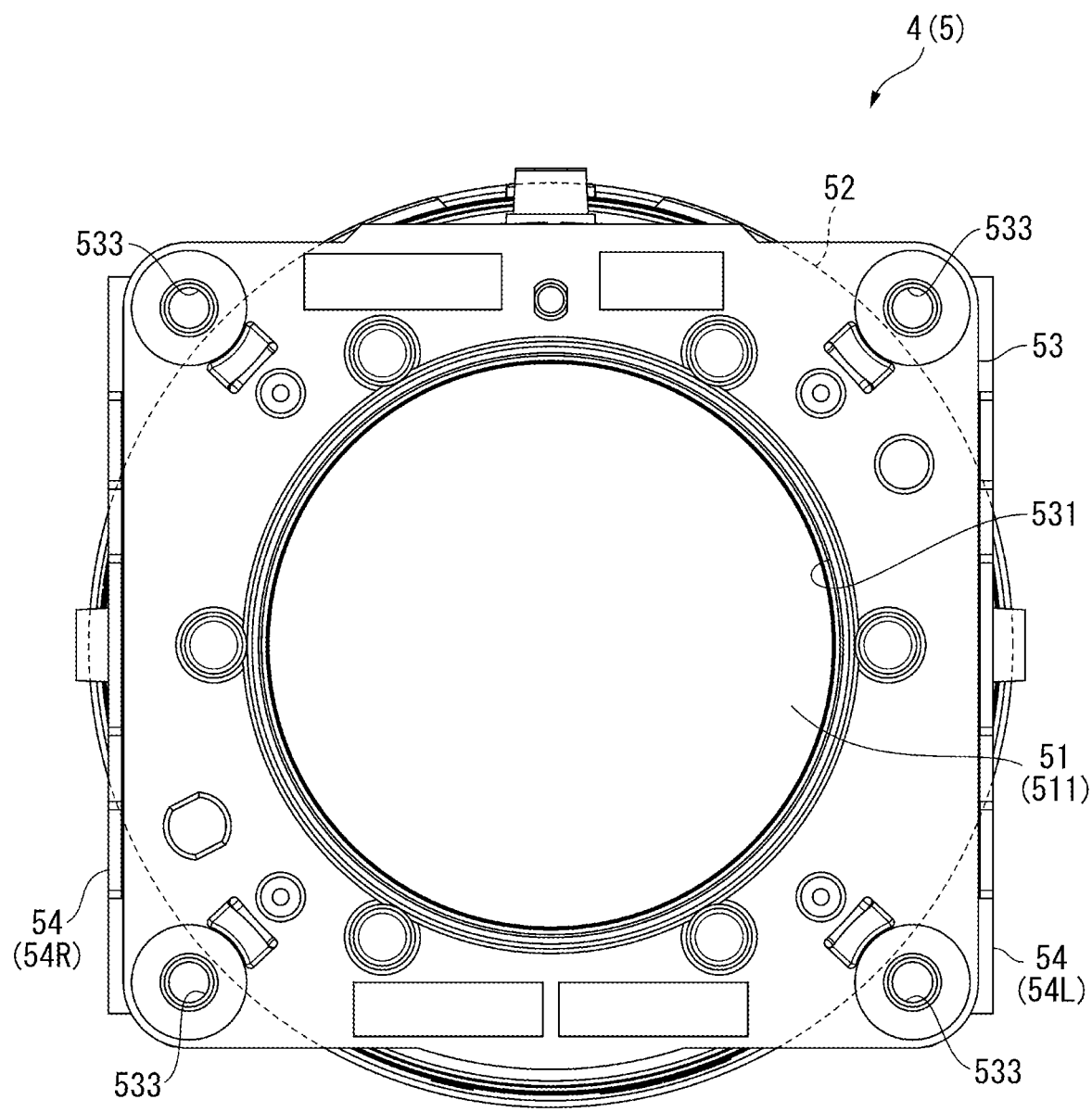
FIG. 9 is a diagram of the projection optical device according to the embodiment viewed from a light incident side.

FIG. 9 is a diagram of the projection optical device 5 viewed from the −Z direction, which is the light incident side.

As shown in FIGS. 7 to 9, the flange 53 is a rectangular plate-like portion attached to the end portion on the light incident side in the lens barrel 52 to expand to a radial direction outer side of the lens barrel 52. That is, the flange 53 is provided in the lens barrel 52. The flange 53 includes an opening section 531 (FIGS. 7 to 9), recesses 532 (FIGS. 7 and 8), and a plurality of through-holes 533 (FIGS. 8 and 9).

The opening section 531 pierces through the flange 53 in the +Z direction. A part of the lens barrel 52 is inserted through the opening section 531 from the +Z direction. Therefore, the incident side lens 511 is exposed in the −Z direction with respect to the flange 53 via the opening section 531.

As shown in FIGS. 7 and 8, the recesses 532 are provided on a side surface in the +X direction and a side surface in the −X direction in the flange 53.

As shown in FIGS. 8 and 9, the plurality of through-holes 533 are disposed at four corners of the flange 53 when viewed from the −Z direction. Specifically, the through-holes 533 are disposed further on the outer side than the external shape of the lens barrel 52 indicated by a dotted line in FIG. 9 when viewed from the −Z direction. The through-holes 533 pierce through the flange 53 in the +Z direction. Screws S1 (see FIG. 6) inserted through a holding member 61 explained below of the moving device 6 are inserted through the through-holes 533 in the +Z direction. That is, the through-holes 533 are fixed sections fixed to the holding member 61 by the screws S1.

Configuration of the Mounting Members

As shown in FIGS. 7 and 8, the two mounting members 54 are configured as members separate from the lens barrel 52 and the flange 53 and disposed in the +Z direction with respect to the flange 53. The two mounting members 54 are used when the projection optical device 5 and the holing member 61 are combined.

For convenience of explanation, of the two mounting members 54, the mounting member 54 disposed in the +X direction is represented as a mounting member 54R and the mounting member 54 disposed in the −X direction is represented as a mounting member 54L.

Each of the mounting members 54L and 54R includes a flat section 541, two attaching sections 542, two bending sections 543, and two screw holes 544.

The flat section 541 is a flat portion extending along a YZ plane.

The two attaching sections 542 are claw sections bent from the end edge in the −Z direction in the flat section 541. As shown in FIG. 7, the two attaching sections 542 included in the mounting member 54R are bent in the −X direction from the flat section 541 and inserted into the recesses 532 provided on the side surface in the +X direction in the flange 53. As shown in FIG. 8, the two attaching sections 542 included in the mounting member 54L are bent in the +X direction from the flat section 541 and inserted into the recesses 532 provided on the side surface in the −X direction in the flange 53.

As shown in FIG. 7, the two bent sections 543 are portions bent from the end portion in the +Y direction and the end portion in the −Y direction in the flat section 541 and opposed to the surface in the +Z direction in the flange 53. The two bent sections 543 included in the mounting member 54R are bent in the −X direction from the flat section 541 and disposed to be opposed to the surface in the +Z direction in the flange 53. The two bent sections 543 included in the mounting member 54L are bent in the +X direction from the flat section 541 and disposed to be opposed to the surface in the +Z direction in the flange 53.

The two screw holes 544 pierce through the bent sections 543 of the mounting member 54 corresponding to the two screw holes 544 in the +Z direction. The screws S1 inserted through hole sections 622 (see FIG. 11) of the holding member 61 and the through-holes 533 of the flange 53 are fixed in the screw holes 544.

Configuration of the Moving Device

The moving device 6 moves the projection optical device 5 in the ±Y direction crossing the incident direction of the image light on the projection optical device 5 (the +Z direction) and adjusts a projection position of the image light by the projection optical device 5. The moving device 6 includes, as shown in FIGS. 3 to 6, the holding member 61, a supporting member 64, a driving device 65, a moving member 66, and pressing members 67.

The holding member 61 is supported by the supporting member 64 to be movable in the ±Y direction in a state in which the holding member 61 holds the projection optical device 5. The configuration of the holding member 61 is explained in detail below.

Configuration of the Supporting Member

The supporting member 64 is equivalent to the other member of the holding member 61 and the supporting member 64. The supporting member 64 supports the holding member 61, the driving device 65, and the moving member 66 and is fixed to the optical component housing 36. The supporting member 64 includes, as shown in FIGS. 5 and 6, a front surface section 64A, a rear surface section 64B, a top surface section 64C, a bottom surface section 64D, a right side surface section 64E, and a left side surface section 64F and is formed in a rectangular tubular shape when viewed from the +Z direction.

The front surface section 64A and the rear surface section 64B are portions crossing the +Z direction. The front surface section 64A is disposed in the +Z direction with respect to the rear surface section 64B. The top surface section 64C and the bottom surface section 64D are portions crossing the +Y direction. The top surface section 64C is disposed in the +Y direction with respect to the bottom surface section 64D. The right side surface section 64E and the left side surface section 64F are portions crossing the +X direction. The right side surface section 64E is disposed in the +X direction with respect to the left side surface section 64F.

On the inner side of the supporting member 64, a housing space SP1 surrounded by the rear surface section 64B, the top surface section 64C, the bottom surface section 64D, the right side surface section 64E, and the left side surface section 64F is formed. When the supporting member 64 and the holding member 61 are combined, a box-like member 62 explained below of the holding member 61 is disposed in the housing space SP1.

As shown in FIG. 5, the supporting member 64 includes a disposing section 641 on which the driving device 65 is disposed. The disposing section 641 is provided across the front surface section 64A and the top surface section 64C.

As shown in FIG. 6, the supporting member 64 includes an oval-shaped passage opening 642 provided on the rear surface section 64B and having a major diameter in the +Y direction. The image light emitted from the image forming section 35 is made incident on the projection optical device 5 via the passage opening 642.

Figure 10:
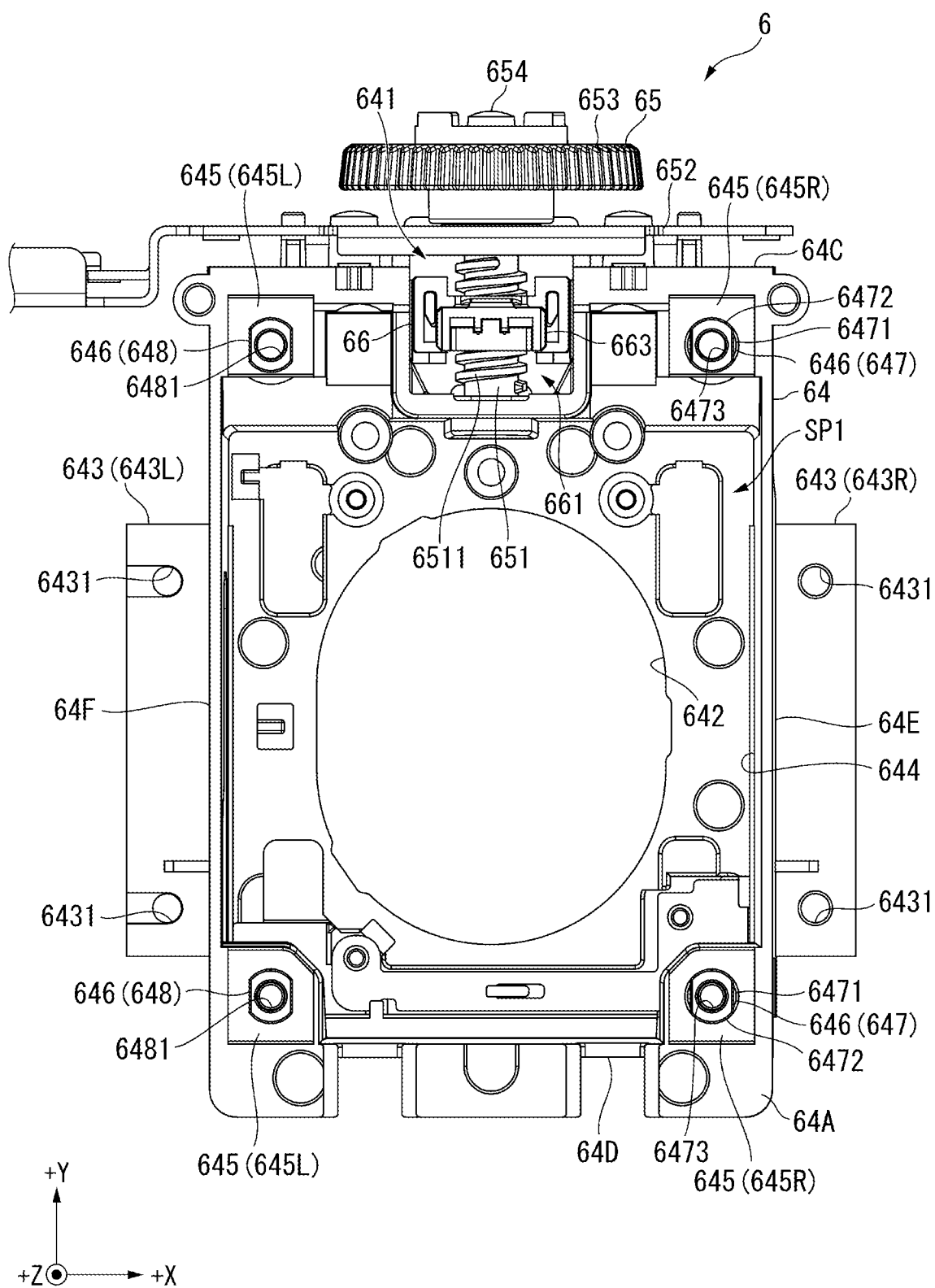
FIG. 10 is a diagram of a supporting member according to the embodiment viewed from a light emission side.

FIG. 10 is a diagram of the supporting member 64 viewed from the +Z direction.

As shown in FIGS. 6 and 10, the supporting member 64 includes two arm sections 643 fixed to the optical component housing 36. Of the two arm sections 643, the arm section 643 disposed in the +X direction is represented as an arm section 643R and the arm section 643 disposed in the −X direction is represented as an arm section 643L. The arm section 643R projects in the +X direction from the right side surface section 64E. The arm section 643L projects in the −X direction from the left side surface section 64F.

The arm sections 643R and 643L include hole sections 6431, through which screws (not shown) are inserted, provided in positions near both ends in the +Y direction and positioning protrusions 6432 inserted into the optical component housing 36. In a state in which the positioning protrusions 6432 are inserted into the optical component housing 36, the screws inserted through the hole sections 6431 in the −Z direction are fixed to the optical component housing 36, whereby the supporting member 64 is fixed to the optical component housing 36.

The supporting member 64 includes, as shown in FIG. 10, an opening section 644 provided on the front surface section 64A, four guide surfaces 645, and four bosses 646.

The opening section 644 is opened in the +Z direction. The opening section 644 is an opening section for housing the box-like member 62, which holds the projection optical device 5, in the housing space SP1.

Each of the four guide surfaces 645 comes into contact with a sliding member 63 explained below of the holding member 61 and guides movement of the holding member 61 in the ±Y direction. The guide surfaces 645 are provided at four corners of the front surface section 64A on the outer side of the opening section 644 when viewed from the +Z direction. That is, the four guide surfaces 645 include two first guide surfaces 645R disposed in the +X direction and separated from each other in the +Y direction and two second guide surfaces 645L disposed in the −X direction and separated from each other in the +Y direction. The first guide sections 645R and the second guide sections 645L are separated from each other in the +X direction.

Such guide surfaces 645R and 645L are flat surfaces extending along an XY plane. In other words, the guide surfaces 645R and 645L are flat surfaces orthogonal to the +Z direction.

The four bosses 646 include two first bosses 647 disposed in the +X direction and two second bosses 648 disposed in the −X direction. Specifically, each of the four bosses 646 is provided on the guide surface 645 corresponding to the boss 646 among the four guide surfaces 645.

Specifically, of the two first bosses 647, the first boss 647 in the +Y direction projects in the +Z direction from the first guide surface 645R in the +X direction and the +Y direction and the first boss 647 in the −Y direction projects in the +Z direction from the first guide surface 645R in the +X direction and the −Y direction.

Of the two second bosses 648, the second boss 648 in the +Y direction projects in the +Z direction from the second guide surface 645L in the −X direction and the +Y direction and the second boss 648 in the −Y direction projects in the +Z direction from the second guide surface 645L in the −X direction and the −Y direction.

The two first bosses 647 and the two second bosses 648 are inserted into, in the +Z direction, guide holes 636 corresponding to the bosses 647 and 648 among four guide holes 636 explained below of the holding member 61.

A shape of the first bosses 647 and a shape of the second bosses 648 are different. This is explained in detail below.

Configuration of the Driving Device

The driving device 65 is coupled to the holding member 61 via the moving member 66 and moves the holding member 61 in the ±Y direction. The driving device 65 includes, as shown in FIG. 10, a screw gear 651, a pressing member 652, a dial 653, and a fixture 654.

The screw gear 651 is a shaft-like member supported by the supporting member 64 to be capable of turning centering on a turning axis extending in the +Y direction. An extended line of the center axis of the screw gear 651 is orthogonal to the center axis of the projection optical device 5. The screw gear 651 includes a spiral groove 6511 provided on a circumferential surface centering on the turning axis of the screw gear 651. The moving member 66 meshes in the spiral groove 6511.

The pressing member 652 is fixed to the top surface section 64C to cover the disposing section 641 in the +Y direction. The pressing member 652 restricts a drop of the screw gear 651 from the disposing section 641. The pressing member 652 is formed by, for example, bending sheet metal.

The dial 653 is disposed in the +Y direction with respect to the pressing member 652 and coupled to the screw gear 651 by the fixture 654. A turning axis of the dial 653 coincides with the turning axis of the screw gear 651. When the dial 653 is rotated by the user, the screw gear 651 is rotated in the same direction as a rotating direction of the dial 653.

Instead of the dial 653 rotated by the user, the driving device 65 may include driving means such as a motor that rotates the screw gear 651.

Configuration of the Moving Member

Figure 11:
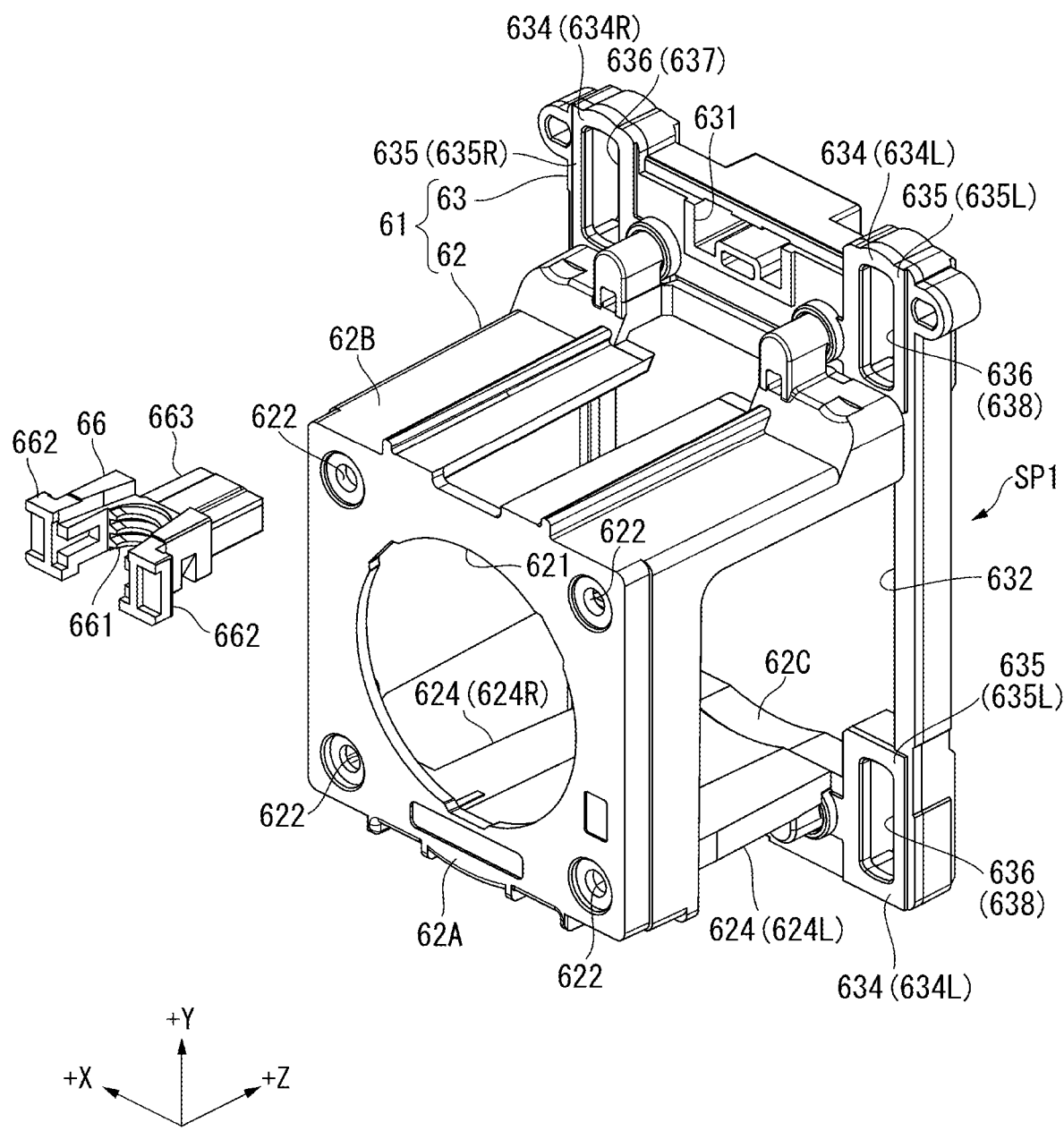
FIG. 11 is a perspective view showing a holding member and a moving member according to the embodiment.

FIG. 11 is a perspective view showing the holding member 61 and the moving member 66.

The moving member 66 is moved in the ±Y direction by the driving device 65 and moves the holding member 61 in the ±Y direction. As shown in FIG. 11, the moving member 66 includes a meshing section 661, restricting sections 662, and an inserting section 663 and is formed in a substantially Y shape when viewed from the +Y direction.

The meshing section 661 is formed in an arcuate shape recessed in the +Z direction when viewed from the +Y direction. The meshing section 661 meshes with the spiral groove 6511 of the screw gear 651.

The restricting sections 662 extend in directions separating from each other from both the end portions of the meshing section 661 in the +X direction. Although not shown, the restricting sections 662 come into contact with the inner wall of the disposing section 641 to restrict a drop of the moving member 66 in the +Z direction from the disposing section 641 and restrict the moving member 66 from turning together with the screw gear 651. When the screw gear 651 is rotated by the dial 653, the moving member 66 is moved in the ±Y direction.

The inserting section 663 is a projecting portion projecting in the +Z direction and is inserted into a recess 631 of the holding member 61. The inserting section 663 is formed of a material (for example, resin) deformed by a pressing force into the recess 631 to be capable of suppressing backlash.

Configuration of the Holding Member

Figure 12:
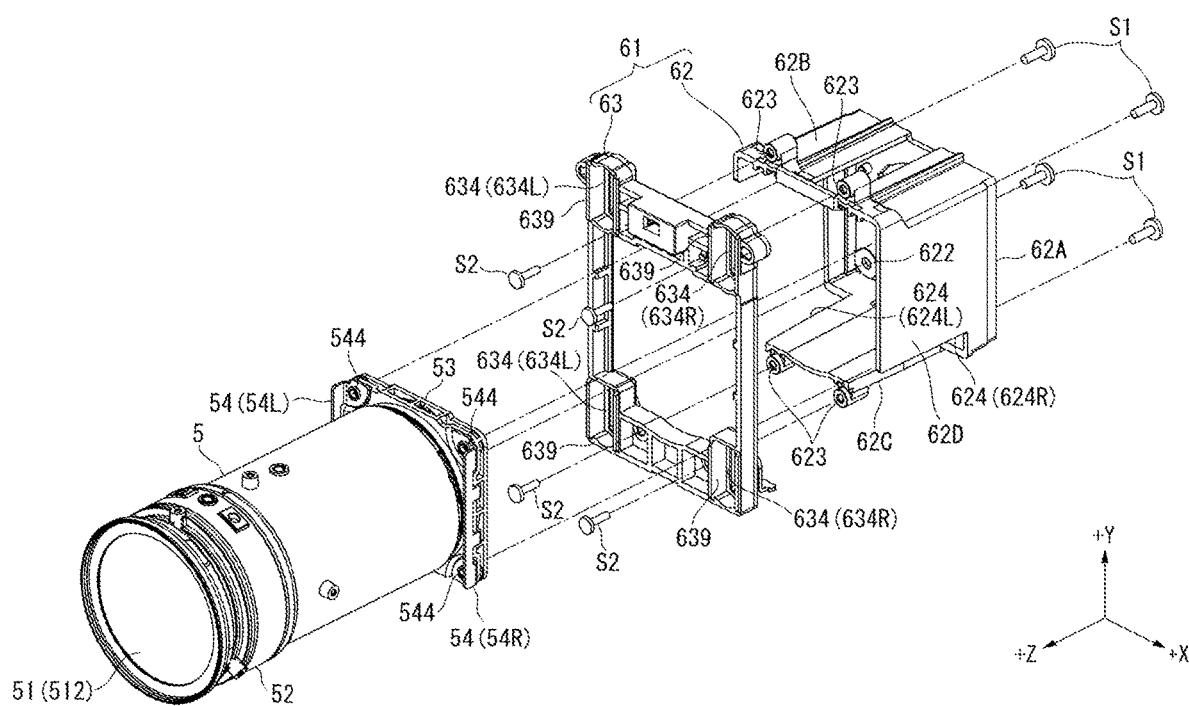
FIG. 12 is an exploded perspective view showing the projection optical device and the holding member according to the embodiment.
Figure 13:
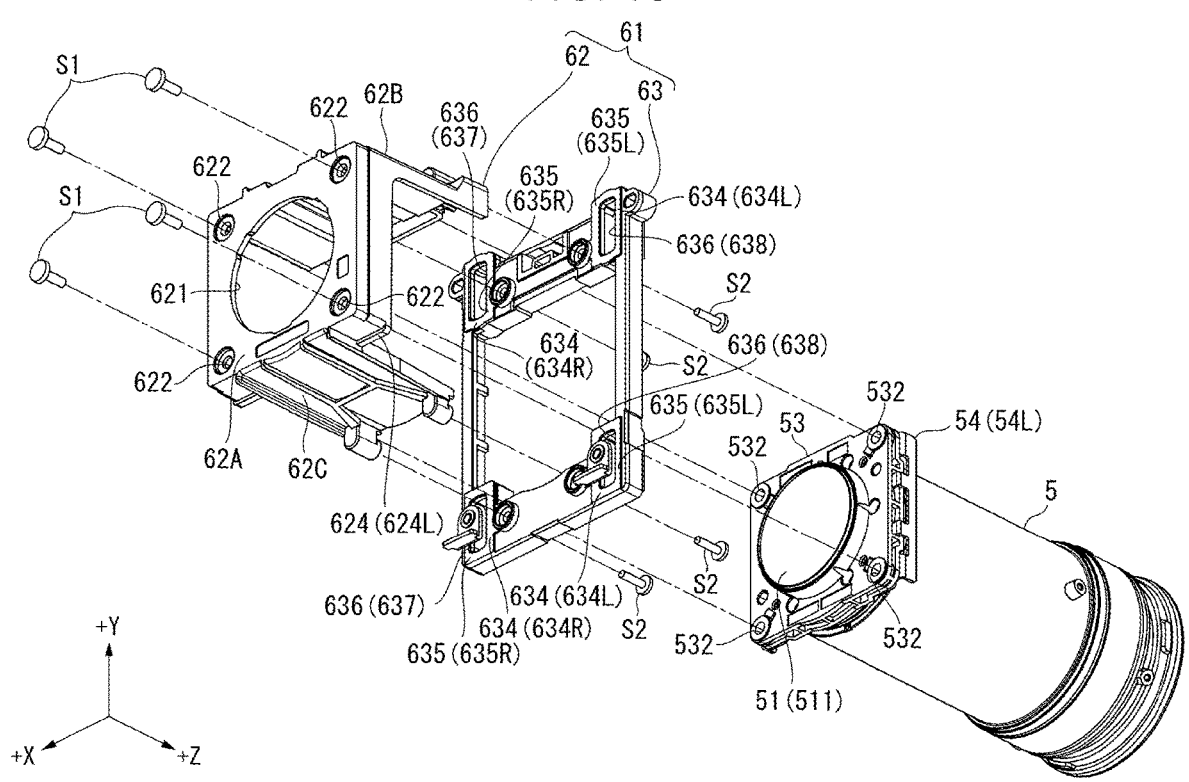
FIG. 13 is an exploded perspective view showing the projection optical device and the holding member according to the embodiment.

FIG. 12 is an exploded perspective view of the projection optical device 5 and the holding member 61 viewed from the +Z direction. FIG. 13 is an exploded perspective view of the projection optical device 5 and the holding member 61 viewed from the −Z direction.

The holding member 61 is equivalent to one member of the holding member 61 and the supporting member 64. The holding member 61 holds the projection optical device 5 and is supported by the supporting member 64 to be movable in the +Y direction. The holding member 61 is moved in the ±Y direction via the moving member 66 moved by the driving device 65.

As shown in FIGS. 11 to 13, the holding member 61 includes the box-like member 62 disposed in the −Z direction and the sliding member 63 disposed in the +Z direction and is configured by combining the box-like member 62 and the sliding member 63. However, not only this, but the holding member 61 may be an integrally molded product including a portion corresponding to the box-like member 62 and a portion corresponding to the sliding member 63.

Configuration of the Box-Like Member

The box-like member 62 is formed in a box shape covering the end portion in the −Z direction in the projection optical device 5. The box-like member 62 includes a holding section 62A opposed to the surface in the −Z direction in the flange 53 and connecting sections 62B, 62C, and 62D extending in the +Z direction from the outer edge of the holding section 62A and connected to the sliding member 63.

The holding section 62A is disposed in the −Z direction with respect to the flange 53 and holds the flange 53. As shown in FIG. 11, the holding section 62A is formed in a rectangular shape having size corresponding to the flange 53. The holding section 62A includes an opening section 621 and four hole sections 622.

The opening section 621 is formed in a substantially circular shape in the center of the holding section 62A. The opening section 621 is an opening section through which image light made incident on the projection optical device 5 passes.

The four hole sections 622 are provided at four corners of the holding section 62A when viewed from the −Z direction. The screws S1 are inserted through the four hole sections 622 from the −Z direction. As shown in FIGS. 12 and 13, the screws S1 inserted through the hole sections 622 are inserted through the through-holes 533 of the flange 53 and fixed in the screw holes 544 of the mounting member 54. Consequently, the flange 53 and the projection optical device 5 are integrated with the box-like member 62 and the holding member 61.

As shown in FIGS. 11 and 13, the connecting section 62B extends in the +Z direction from the end edge in the +Y direction in the holding section 62A. As shown in FIGS. 11 to 13, the connecting section 62C extends in the +Z direction from the end edge in the −Y direction in the holding section 62A. As shown in FIG. 12, the connecting section 62D extends in the +Z direction from the end edge in the +X direction in the holding section 62A.

As shown in FIG. 12, two screw holes 623 in which screws S2 for fixing the sliding member 63 to the box-like member 62 are screwed are provided at each of the end portions in the +Z direction in the connecting sections 62B and 62C.

As shown in FIGS. 11 and 12, the box-like member 62 includes two cutouts 624 provided in a portion in the +X direction and a portion in the −X direction in the connecting section 62C.

Of the two cutouts 624, a cutout 624R in the +X direction is formed across the connecting sections 62C and 62D. In the cutout 624R, when the holding member 61 is supported by the supporting member 64, the first guide surface 645R and the first boss 647 in the +X direction and the −Y direction in the supporting member 64 are disposed.

Of the two cutouts 624, a cutout 624L in the −X direction is formed in the connecting section 62C. In the cutout 624L, when the holding member 61 is supported by the supporting member 64, the second guide surface 645L and the second boss 648 in the −X direction and the −Y direction in the supporting member 64 are disposed.

Consequently, a first contact surface 635R of a first contact section 634R disposed in the +X direction and the −Y direction in the holding member 61 comes into contact with the first guide surface 645R in the +X direction and the −Y direction. A second contact surface 635L of a second contact section 634L disposed in the −X direction and the −Y direction in the holding member 61 comes into contact with the second guide surface 645L in the −X direction and the −Y direction. The first contact section 634R and the second contact section 634L are explained in detail below.

Configuration of the Sliding Member

The sliding member 63 is a rectangular frame-like member that moves in the ±Y direction along the supporting member 64. The sliding member 63 is fixed to the box-like member 62 by the screws S2.

The sliding member 63 includes the recess 631 as shown in FIGS. 11 and 13.

The recess 631 is provided on the surface in the −Z direction in the sliding member 63. The insertion section 663 of the moving member 66 is inserted into the recess 631 from the −Z direction.

Figure 14:
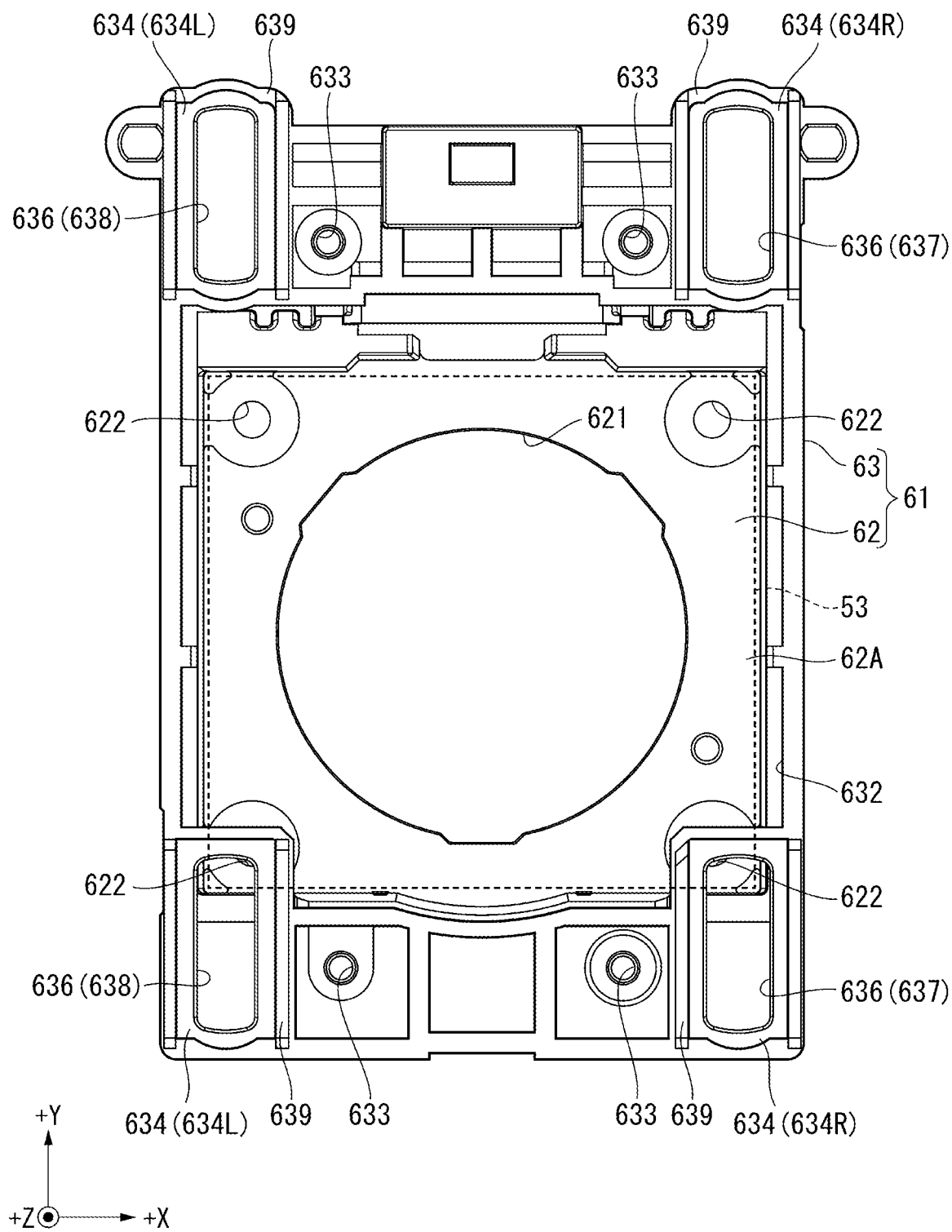
FIG. 14 is a diagram of the holding member according to the embodiment viewed from the light emission side.

FIG. 14 is a diagram of the holding member 61 viewed from the light emission side.

The sliding member 63 further includes, as shown in FIG. 14, an opening section 632, a plurality of hole sections 633, a plurality of contact sections 634, a plurality of guide holes 636, and a plurality of frame sections 639.

A portion in the −Z direction in the lens barrel 52 and the flange 53 are inserted through the opening section 632 from the +Z direction.

The plurality of hole sections 633 are hole sections through which the screws S2 for fixing the box-like member 62 and the sliding member 63 are inserted from the +Z direction. In this embodiment, the plurality of hole sections 633 include two hole sections 633 provided to be separated from each other in the +X direction in positions in the +Y direction with respect to the opening section 632 and two hole sections 633 provided to be separated from each other in the +X direction in positions in the −Y direction with respect to the opening section 632.

The plurality of contact sections 634 are provided at four corners of the sliding member 63 on the outer side of the opening section 632 when viewed from the +Z direction. The plurality of contact sections 634 include two first contact sections 634R disposed in the +X direction and separated from each other in the +Y direction and two second contact sections 634L disposed in the −X direction and separated from each other in the +Y direction.

The contact sections 634 come into contact with the guide surfaces 645 corresponding to the contact sections 634 among the plurality of guide surfaces 645 and slide in the ±Y direction along the guide surfaces 645. The surfaces in the −Z direction in the contact sections 634 are contact surfaces 635 that come into contact with the guide surfaces 645 corresponding to the contact surfaces 635. The contact surfaces 635 are provided on the emission side of the image light by the projection optical device 5 (in the +Z direction) with respect to the holding section 62A.

In the following explanation, among the plurality of contact surfaces 635, contact surfaces of the first contact sections 634R, the contact surfaces being in contact with the first guide surfaces 645R corresponding to the contact surfaces, are represented as the first contact surfaces 635R and contact surfaces of the second contact sections 634L, the contact surfaces being in contact with the second guide surfaces 645L corresponding to the contact surfaces, are represented as the second contact surfaces 635L. That is, the holding member 61 includes the first contact surfaces 635R that are in contact with the first guide surfaces 645R of the supporting member 64 and the second contact surfaces 635L that are in contact with the second guide surfaces 645L of the supporting member 64.

Each of the plurality of guide holes 636 is an oval-shaped hole section having a major diameter in the +Y direction, the boss 646 corresponding to the hole section among the plurality of bosses 646 being inserted into the inside of the hole section.

The guide holes 636 are provided in the contact sections 634 corresponding to the guide holes 636 among the plurality of contact sections 634. That is, the plurality of guide holes 636 are provided at four corners of the rectangular frame-like sliding member 63 to correspond to the contact sections 634 corresponding to the guide holes 636. In other words, the holding member 61 includes the plurality of guide holes 636, and the guide holes 636 are provided on the contact surfaces 635 corresponding to the guide holes 636 among the plurality of contact surfaces 635. The plurality of guide holes 636 include two first guide holes 637 respectively provided in the two first contact sections 634R in the +X direction and two second guide holes 638 respectively provided in the two second contact sections 634L in the −X direction. The two first guide holes 637 and the two second guide holes 638 are provided to be separated from each other in the +X direction. The first boss 647 corresponding to each of the two first guide holes 637 among the two first bosses 647 is inserted into the first guide hole 637 from the −Z direction. The second boss 648 corresponding to each of the two second guide holes 638 among the two second bosses 648 is inserted into the second guide hole 638 from the −Z direction.

The plurality of frame sections 639 are respectively provided in the plurality of contact sections 634 to surround the guide holes 636 in a frame shape when viewed from the +Z direction. The frame sections 639 stand in the +Z direction from the peripheral edges of the contact sections 634. The pressing members 67 (see FIGS. 5 and 6) provided in the bosses 646 inserted through the guide holes 636 are disposed on the inner sides of the frame sections 639.

A part of each of two contact sections 634 disposed in the −Y direction (the first contact section 634R in the −Y direction and the second contact section 634L in the −Y direction) among four contact sections 634 overlaps the flange 53 indicated by a dotted line in FIG. 14 when viewed from the +Z direction. That is, a part of each of two contact surfaces 635 disposed in the −Y direction (the first contact surface 635R in the −Y direction and the second contact surface 635L in the −Y direction) among four contact surfaces 635 shown in FIGS. 11 and 13 overlaps the flange 53 when viewed from the +Z direction. Specifically, a portion in the +Y direction in each of the first contact surface 635R and the second contact surface 635L disposed in the −Y direction overlaps the flange 53 when viewed from the +Z direction. In other words, a portion in the +Y direction in each of two guide holes 636 disposed in the −Y direction (the first guide hole 637 in the −Y direction and the second guide hole 638 in the −Y direction) among four guide holes 636 overlaps the flange 53 when viewed from the +Z direction as shown in FIG. 14.

Figure 15:
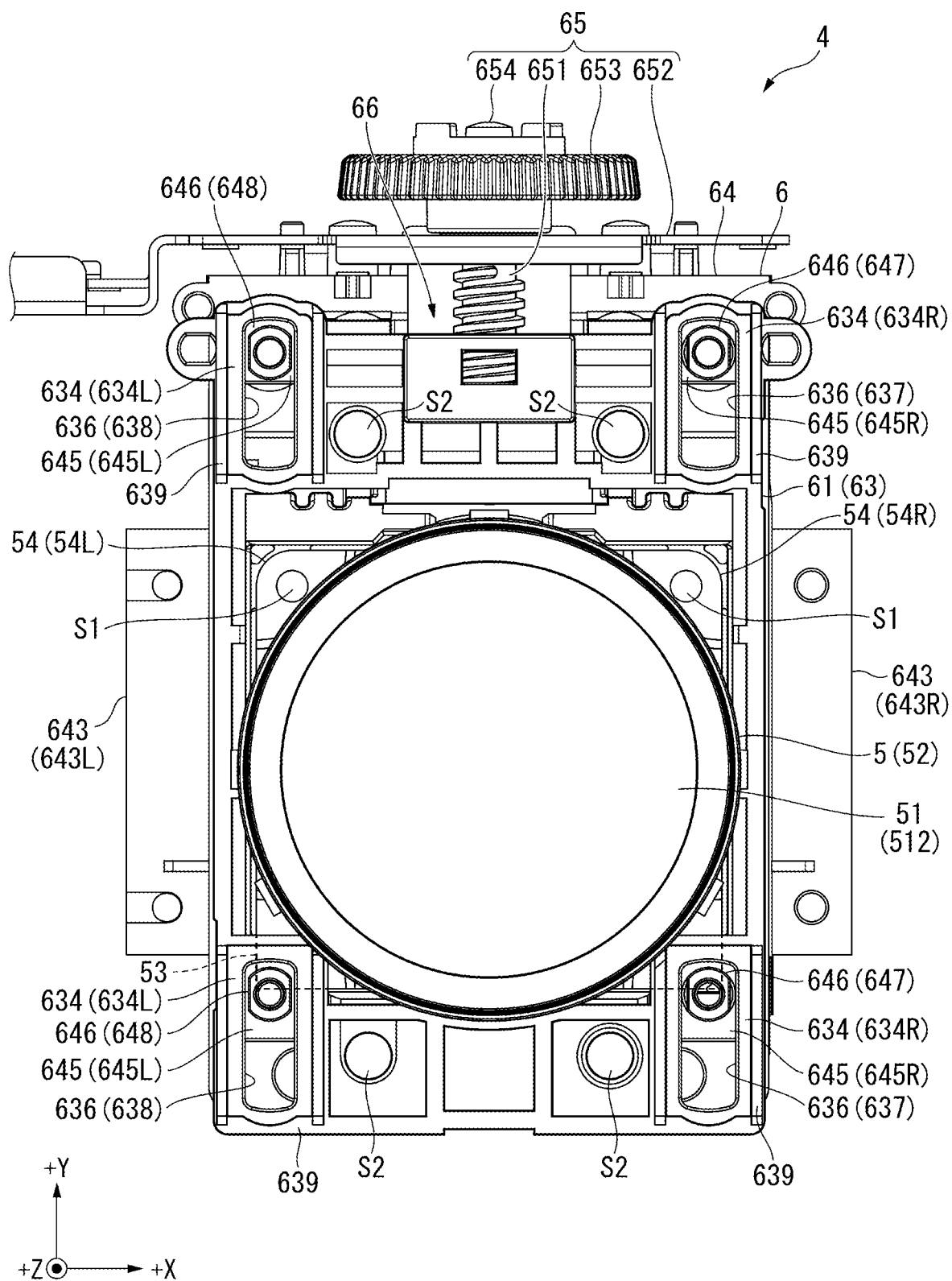
FIG. 15 is a diagram showing the projection optical unit in a state in which the holding member and the projection optical device are relatively moved in a +Y direction most with respect to the supporting member according to the embodiment.
Figure 16:
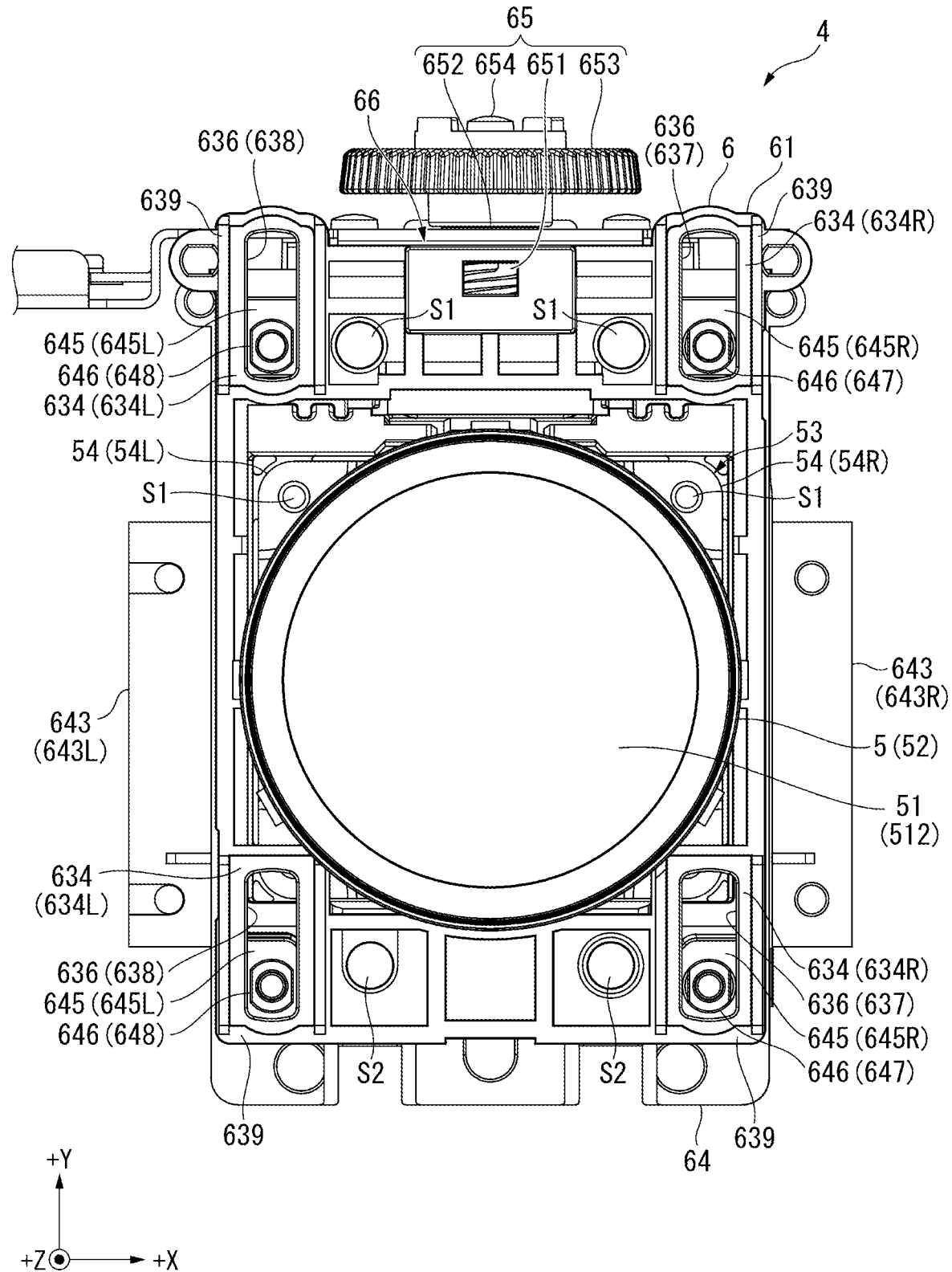
FIG. 16 is a diagram showing the projection optical unit in a state in which the holding member and the projection optical device are relatively moved in a −Y direction most with respect to the supporting member according to the embodiment.

FIG. 15 is a diagram of the projection optical unit 4 viewed from the +Z direction in a state in which the holding member 61 and the projection optical device 5 are moved in the −Y direction most with respect to the supporting member 64. FIG. 16 is a diagram of the projection optical unit 4 viewed from the +Z direction in a state in which the holding member 61 and the projection optical device 5 are moved in the +Y direction most with respect to the supporting member 64. In FIGS. 15 and 16, illustration of the pressing members 67 is omitted.

Therefore, as shown in FIG. 15, in a state in which the holding member 61 is moved in the −Y direction most with respect to the supporting member 64, each of two bosses 646 disposed in the −Y direction (the first boss 647 in the −Y direction and the second boss 648 in the −Y direction) among the plurality of bosses 646 overlaps the flange 53.

On the other hand, as shown in FIG. 16, in a state in which the holding member 61 is moved in the +Y direction most with respect to the supporting member 64, the two bosses 646 disposed in the −Y direction (the first boss 647 in the −Y direction and the second boss 648 in the −Y direction) among the plurality of bosses 646 do not overlap the flange 53.

Therefore, when a projection optical unit in which parts of the two contact surfaces 635 in the −Y direction do not overlap the flange 53 is adopted as a comparative example, in the projection optical unit 4 according to this embodiment, compared with the projection optical unit of the comparative example, it is possible to set the dimension in the +Y direction in the projection optical unit 4 smaller than the dimension in the +Y direction in the projection optical unit of the comparative example while setting a movable range of the projection optical device 5 in the same range.

It is conceivable to reduce the dimension in the +Y direction of the flange 53 in order to reduce the dimension in the +Y direction of the projection optical unit while configuring the parts of the two contact surfaces 635 in the −Y direction not to overlap the flange 53. However, in this case, the flange 53 tends to tilt with respect to the holding section 62A of the holding member 61. Image light projected by the projection optical device 5 tends to be deteriorated.

In contrast, in the projection optical unit 4, since it is unnecessary to reduce the flange 53 in size, the holding section 62A can be configured large. Consequently, it is possible to prevent the flange 53 from tilting with respect to the holding section 62A. Therefore, it is possible to not only reduce the projection optical unit 4 in size but also prevent deterioration of an image projected by the projection optical device 5.

Configurations of the Bosses and the Guide Holes

Figure 17:
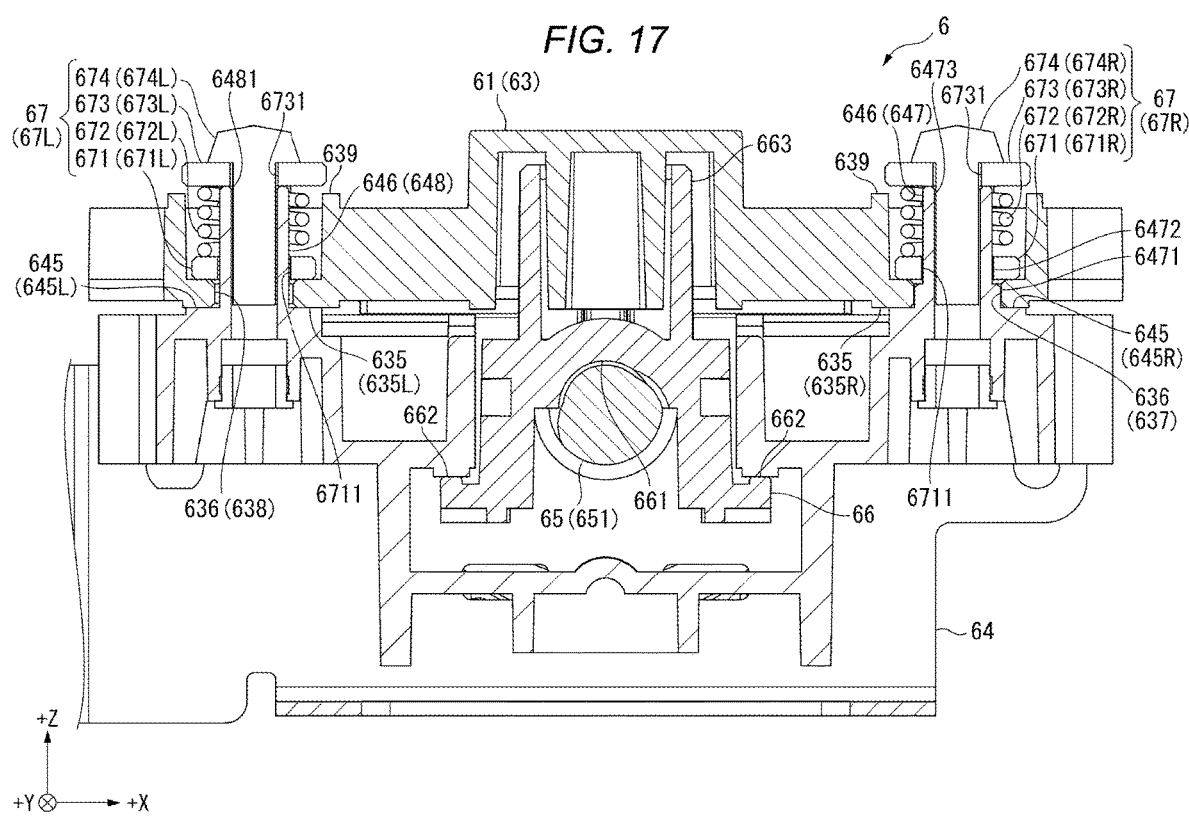
FIG. 17 is a sectional view showing the holding member, the supporting member, and a pressing member according to the embodiment.

FIG. 17 is a diagram showing a cross section taken along an XZ plane of the holding member 61 and the supporting member 64. Specifically, FIG. 17 is a diagram showing a cross section taken along the XZ plane of the holding member 61 and the supporting member 64 in the first guide hole 637 in the +Y direction and the second guide hole 638 in the +Y direction.

Subsequently, the shape of the first boss 647 and the shape of the second boss 648 are explained with reference to FIG. 17. In the following explanation, the shape of the first boss 647 in the +Y direction and the shape of the second boss 648 in the +Y direction are explained. However, the shape of the first boss 647 in the −Y direction and the shape of the second boss 648 in the −Y direction are the same.

Detailed Configuration of the First Boss

The first boss 647 is inserted into, of the two first guide holes 637 disposed in the +X direction among the plurality of guide holes 636, the first guide hole 637 corresponding to the first boss 647. The first boss 647 includes, as shown in FIG. 17, an expanded diameter section 6471, a reduced diameter section 6472, and a fixing section 6473.

The expanded diameter section 6471 is provided in a portion on the opposite direction (the −Z direction) of a projecting direction of the first boss 647 from the first guide surface 645R. That is, the expanded diameter section 6471 is provided in a proximal end portion of the first boss 647. As shown in FIG. 10, the expanded diameter section 6471 is formed in a circular shape when viewed from the +Z direction. That is, both the ends in the +X direction in the expanded diameter section 6471 is formed in an arcuate shape centering on the center of the expanded diameter section 6471 when viewed from the +Z direction. When the first boss 647 is inserted into the inside of the first guide hole 637, the expanded diameter section 6471 is disposed on the inside of the first guide hole 637 and the side surface of the expanded diameter section 6471 can come into contact with the inner surface of the first guide hole 637.

The dimension in the +X direction in the expanded diameter section 6471 substantially coincides with the inner diameter in the +X direction in the first guide hole 637. That is, the inner diameter in the +X direction (the second direction) in the first guide hole 637 substantially coincides with the outer diameter in the +X direction in the first boss 647. The dimension in the +Z direction in the expanded diameter section 6471 is smaller than the dimension in the +Z direction in the contact section 634. In other words, the dimension in the +Z direction in the expanded diameter section 6471 is smaller than the dimension in the +Z direction in the first guide hole 637. Therefore, when the first boss 647 is inserted into the first guide hole 637, the surface in the +Z direction in the expanded diameter section 6471 is disposed further in the −Z direction than the surface in the +Z direction in the contact section 634.

The reduced diameter section 6472 projects in the +Z direction from the expanded diameter section 6471. The outer diameter in the +X direction in the reduced diameter section 6472 is smaller than the outer diameter in the +X direction in the expanded diameter section 6471. Both the ends in the +X direction in the reduced diameter section 6472 are formed in a linear shape in the +Y direction when viewed from the +Z direction. The reduced diameter section 6472 is inserted into an interposed member 671 of the pressing member 67 explained below.

The fixing section 6473 is provided at the end portion in the +Z direction in the first boss 647. The fixing section 6473 is a screw hole to which a screw 674 of the pressing member 67 explained below is fixed.

Detailed Configuration of the Second Boss

As explained above, the second boss 648 projects in the +Z direction from the second guide surface 645L and is inserted into, of the two second guide holes 638, the second guide hole 638 corresponding to the second boss 648. Unlike the first boss 647, the second boss 648 does not include an expanded diameter section. That is, the second boss 648 has substantially the same outer diameter and substantially the same sectional shape from the end portion in the −Z direction to the end portion in the +Z direction.

The second boss 648 is formed in the same shape as the reduced diameter section 6472 when viewed from the +Z direction. That is, both the ends in the +X direction in the second boss 648 is formed in a linear shape in the +Y direction when viewed from the +Z direction.

The outer diameter in the +X direction in the second boss 648 is substantially the same as the outer diameter in the +X direction in the reduced diameter section 6472 but is smaller than the inner diameter in the +X direction in the second guide hole 638.

Such a second boss 648 includes a fixing section 6481. The fixing section 6481 is provided at the end portion in the +Z direction in the second boss 648. Like the fixing section 6473, the fixing section 6481 is a screw hole to which the screw 674 of the pressing member 67 explained below is fixed.

The fixing sections 6473 and 6481 may be configured by insert nuts inserted into the first boss 647 and the second boss 648 by press fitting or the like.

Configuration of the Pressing Member

The pressing members 67 press and urge the holding member 61 to the supporting member 64. Specifically, the pressing members 67 urge the holding member 61 to the supporting member 64 and maintain a state in which the guide surface 645 of the supporting member 64 and the contact surface 635 of the holding member 61 are in contact. As shown in FIGS. 5 and 6, the pressing members 67 are attached to the bosses 646 inserted through the guide holes 636. That is, four pressing members 67 are provided in the projection optical unit 4 to correspond to the four bosses 646. Specifically, the pressing members 67 include two first pressing members 67R respectively attached to the two first bosses 647 and two second pressing members 67L respectively attached to the two second bosses 648.

As shown in FIGS. 5, 6, and 17, the pressing members 67 are configured by the interposed members 671, urging members 672, washers 673, and the screws 674.

The interposed members 671 are disposed to be in contact with the surfaces in the +Z direction in the contact sections 634. That is, the interposed members 671 are in contact with the holding member 61. The interposed members 671 are ring-like members including insertion holes 6711. The bosses 646 are inserted through the insertion holes 6711.

In the interposed members 671, the shape of the insertion hole 6711 of a first interposed member 671R provided in the first boss 647 is a shape corresponding to the external shape of the reduced diameter section 6472 when viewed from the +Z direction. The reduced diameter section 6472 is inserted through the insertion hole 6711 of the first interposed member 671R.

In the interposed members 671, the shape of the insertion hole 6711 of a second interposed member 671L provided in the second boss 648 is a shape corresponding to the external shape of the second boss 648 when viewed from the +Z direction. The second boss 648 is inserted through the insertion hole 6711 of the second interposed member 671L from the −Z direction.

The urging members 672 press and urge the holding member 61 toward the supporting member 64 via the interposed members 671. The urging members 672 include a first urging member 672R that is provided in the first boss 647 and urges the first interposed member 671R in the −Z direction and a second urging member 672L that is provided in the second boss 648 and urges the second interposed member 671L in the −Z direction.

In this embodiment, the urging members 672 are configured by compression coil springs. The reduced diameter section 6472 is inserted through the first urging member 672R. The end portion in the −Z direction in the first urging member 672R is in contact with the first interposed member 671R. The end portion in the +Z direction in the first urging member 672R is in contact with the washer 673 (a first washer 673R). The second boss 648 is inserted through the second urging member 672L. The end portion in the −Z direction in the second urging member 672L is in contact with the second interposed member 671L. The end portion in the +Z direction in the second urging member 672L is in contact with the washer 673 (a second washer 673L).

The washers 673 support the urging members 672 between the washers 673 and the interposed members 671. The washers 673 include hole sections 6731 through which the screws 674 are inserted. The washers 673 include the first washer 673R attached to the first boss 647 and the second washer 673L attached to the second boss 648.

The screws 674 are fixtures for attaching the washers 673, the urging members 672, and the interposed members 671 to the bosses 646 by attaching the washers 673 to the bosses 646. The screws 674 include a first screw 674R and a second screw 674L.

The first screw 674R is inserted through the hole section 6731 of the first washer 673R and fixed to the fixing section 6473 of the first boss 647. The second screw 674L is inserted through the hole section 6731 of the second washer 673L and fixed to the fixing section 6481 of the second boss 648.

In this way, the first urging member 672R presses the first contact section 634R toward the first guide surface 645R corresponding to the first contact section 634R via the first interposed member 671R and urges the holding member 61 to the supporting member 64. The second urging member 672L presses the second contact section 634L toward the second guide surface 645L corresponding to the second contact section 634L via the second interposed member 671L and urges the holding member 61 to the supporting member 64. Consequently, it is possible to prevent the holding member 61 from tilting in the +Z direction from the supporting member 64.

Effects of the Embodiment

The projector 1 according to this embodiment explained above has the following effects.

The projector 1 includes the projection optical unit 4.

The projection optical unit 4 includes the projection optical device 5 that projects image light and the moving device 6 that moves the projection optical device 5 in the ±Y direction crossing the +Z direction. The +Z direction is equivalent to the incident direction of the image light on the projection optical device 5. The ±Y direction is equivalent to the first direction.

The projection optical device 5 includes the lens barrel 52 that holds the lens 51 and the flange 53 provided in the lens barrel 52 and held by the holding member 61 of the moving device 6.

The moving device 6 includes the holding member 61 and the supporting member 64.

The supporting member 64 supports the holding member 61 to be movable in the ±Y direction. The supporting member 64 includes the guide surfaces 645 that guide the movement of the holding member 61 in the ±Y direction.

The holding member 61 holds the projection optical device 5. The holding member 61 includes the contact surfaces 635 that are in contact with the guide surfaces 645. The guide surfaces 645 and the contact surfaces 635 cross the +Z direction. Parts of the contact surfaces 635 overlap the flange 53 when viewed from the emission side of the image light by the projection optical device 5. Specifically, parts of the two contact surfaces 635 disposed in the −Y direction among the plurality of contact surfaces 635 overlap the flange 53 when viewed from the emission side of the image light by the projection optical device 5.

With such a configuration, compared with when the contact surfaces 635 do not overlap the flange 53 when viewed from the emission side of the image light by the projection optical device 5 (the +Z direction), it is possible to reduce the dimension of the moving device 6 in a relative moving direction of the holding member 61 with respect to the supporting member 64 (the ±Y direction).

It is conceivable to reduce the dimension of the flange 53 in the +Y direction such that at least parts of the contact surfaces 635 do not overlap the flange 53 when viewed from the +Z direction. However, in this case, since a contact range of the holding member 61 and the flange 53 decreases, it is likely that the projection optical device 5 tilts with respect to the holding member 61 and image light projected by the projection optical device 5 is deteriorated. In contrast, with the configuration explained above, it is unnecessary to reduce the dimension of the flange 53 in the +Y direction.

Therefore, it is possible to prevent projected image light from being deteriorated while achieving a reduction in the sizes of the projection optical unit 4 and the projector 1.

In the projector 1, the holding member 61 includes the holding section 62A that holds the flange 53. The contact surfaces 635 are provided on the emission side of the image light by the projection optical device 5 with respect to the holding section 62A. That is, the contact surfaces 635 are provided further in the +Z direction than the holding section 62A.

With such a configuration, the holding section 62A and the contact surfaces 635 are disposed to be separated from each other in the +Z direction. Consequently, it is possible to make it easy to dispose the contact surfaces 635 in positions overlapping the flange 53 held by the holding section 62A when viewed from the +Z direction. Therefore, it is possible to make it easy to achieve a reduction in the size of the projector 1 and prevention of deterioration of the image light.

In the projector 1, the holding member 61 includes the guide holes 636 having the major diameter in the +Y direction. The supporting member 64 includes the bosses 646 inserted into the guide holes 636. The holding member 61 is equivalent to one member of the holding member 61 and the supporting member 64. The supporting member 64 is equivalent to the other member of the holding member 61 and the supporting member 64.

With such a configuration, when the holding member 61 relatively moves in the ±Y direction with respect to the supporting member 64, the bosses 646 relatively move along the guide holes 636. Consequently, it is possible to accurately move the holding member 61 in the ±Y direction.

In the projector 1, the guide holes 636 include the first guide hole 637 and the second guide hole 638 provided to be separated from each other in the +X direction crossing each of the +Z direction and the +Y direction. The bosses 646 include the first boss 647 inserted into the first guide hole 637 and the second boss 648 inserted into the second guide hole 638. The +X direction is equivalent to the second direction.

With such a configuration, the movement of the holding member 61 in the +Y direction is guided by the first boss 647 inserted into the first guide hole 637 and the second boss 648 inserted into the second guide hole 638 separated from the first guide hole 637 in the +X direction. Therefore, it is possible to stably move the holding member 61 and the projection optical device 5 in the ±Y direction.

In the projector 1, the inner diameter in the +X direction in the first guide hole 637 substantially coincides with the outer diameter in the +X direction in the first boss 647. The inner diameter in the +X direction in the second guide hole 638 is larger than the outer diameter in the +X direction in the second boss 648.

With such a configuration, since the inner diameter in the +X direction in the first guide hole 637 substantially coincides with the outer diameter in the +X direction in the first boss 647, it is possible to accurately move the holding member 61 in the +Y direction. Even when tolerance occurs between the first guide hole 637 and the second guide hole 638 in the +X direction and when tolerance occurs between the first boss 647 and the second boss 648 in the +X direction, it is possible to insert the first boss 647 into the first guide hole 637 and insert the second boss 648 into the second guide hole 638. Therefore, it is possible to improve assemblability of the holding member 61 to the supporting member 64.

The projector 1 includes the first interposed member 671R and the first urging member 672R. The first interposed member 671R is provided in the first boss 647 and is in contact with the holding member 61. The first urging member 672R is provided in the first boss 647 and presses and urges the holding member 61 to the supporting member 64 via the first interposed member 671R.

The first boss 647 includes the expanded diameter section 6471 and the reduced diameter section 6472. The expanded diameter section 6471 is disposed on the inside of the first guide hole 637. Both the ends of the expanded diameter section 6471 in the +X direction are formed in an arcuate shape when viewed from the +Z direction. The reduced diameter section 6472 has the outer diameter smaller than the outer diameter of the expanded diameter section 6471. The reduced diameter section 6472 projects in the +Z direction from the expanded diameter section 6471. Both the ends in the +X direction in the reduced diameter section 6472 are formed in a linear shape in the +Y direction when viewed from the +Z direction. The first interposed member 671R includes the insertion hole 6711 formed in the shape corresponding to the external shape of the reduced diameter section 6472 when viewed from the +Z direction. The reduced diameter section 6472 is inserted through the insertion hole 6711. The +Z direction is equivalent to the projecting direction of the first boss 647.

With such a configuration, it is possible to make it easy to form the first boss 647 such that the dimension in the +X direction in the expanded diameter section 6471 substantially coincides with the inner diameter in the +X direction in the first guide hole 637.

The first urging member 672R presses and urges the holding member 61 to the supporting member 64 via the first interposed member 671R. Consequently, it is possible to prevent the holding member 61 from tilting with respect to the supporting member 64 and prevent the projection optical device 5 from tilting with respect to the supporting member 64. At this time, since the first interposed member 671R includes the insertion hole 6711 formed in the shape described above, it is possible to prevent the first interposed member 671R from being rotated centering on the axis extending in the +Z direction. Therefore, it is possible to make it easy to cause a pressing force of the first urging member 672R to act on the holding member 61 via the first interposed member 671R.

The projector 1 includes the second interposed member 671L and the second urging member 672L. The second interposed member 671L is provided in the second boss 648 and is in contact with the holding member 61. The second urging member 672L is provided in the second boss 648 and presses and urges the holding member 61 to the supporting member 64 via the second interposed member 671L.

With such a configuration, the holding member 61 is urged to the supporting member 64 by the first urging member 672R and the second urging member 672L separated from the first urging member 672R in the +X direction. Consequently, it is possible to prevent the holding member 61 and the projection optical device 5 from tilting with respect to the supporting member 64.

In the projector 1, the two first bosses 647 are provided to be separated from each other in the +Y direction and the two second bosses 648 are provided to be separated from each other in the +Y direction. The first interposed member 671R and the first urging member 672R are provided in each of the plurality of first bosses 647. The second interposed member 671L and the second urging member 672L are provided in each of the plurality of second bosses 648.

With such a configuration, the holding member 61 can be urged to the supporting member 64 by the first urging members 672R provided in the first bosses 647 and the second urging members 672L provided in the second bosses 648. Consequently, it is possible to prevent the holding member 61 and the projection optical device 5 from tilting with respect to the supporting member 64. Therefore, it is possible to stably move the holding member 61 in the +Y direction along the supporting member 64.

In the projector 1, the guide surfaces 645 include the first guide surface 645R and the second guide surface 645L provided to be separated from each other in the +X direction. The contact surfaces 635 include the first contact surface 635R that is in contact with the first guide surface 645R and the second contact surface 635L that is in contact with the second guide surface 645L. The first boss 647 is provided on the first guide surface 645R of the first guide surface 645R and the first contact surface 635R. The second boss 648 is provided on the second guide surface 645L of the second guide surface 645L and the second contact surface 635L.

With such a configuration, it is possible to simplify the configuration of, of the holding member 61 and the supporting member 64, the supporting member 64 including the first boss 647 and the second boss 648.

Since the first interposed member 671R and the first urging member 672R are provided in the first boss 647 and the second interposed member 671L and the second urging member 672L are provided in the second boss 648, the contact surface 635 can be pressed against the guide surface 645. Therefore, it is possible to improve sliding stability of the holding member 61 with respect to the supporting member 64.

In the projector 1, the guide hole 636 is provided in the holding member 61, which is one member of the holding member 61 and the supporting member 64. The bosses 646 are provided in the supporting member 64, which is the other member of the holding member 61 and the supporting member 64.

With such a configuration, it is possible to stably move the holding member 61 with respect to the supporting member 64. Besides, the supporting member 64 can stably support the holding member 61.

In the projector 1, the guide hole 636 is provided on the contact surface 635. The boss 646 is provided on the guide surface 645.

With such a configuration, it is possible to surely set the guide surface 645 and the contact surface 635 in contact by inserting the boss 646 into the guide hole 636. Since the guide hole 636 is provided on the contact surface 635 and the boss 646 is provided on the guide surface 645, compared with when each of the contact surface 635 and the guide hole 636 is separately provided and each of the guide surface 645 and the boss 646 is separately provided, it is possible to reduce the moving device 6 including the holding member 61 and the supporting member 64 in size and reduce the projector 1 in size.

Modifications of the Embodiment

The present disclosure is not limited to the embodiment. Modifications, improvements, and the like in a range in which the object of the present disclosure can be achieved are included in the present disclosure.

In the embodiment, when viewed from the +Z direction, a part in the +Y direction of the contact surface 635 disposed in the −Y direction overlaps the flange 53 held by the holding section 62A. However, not only this, but the contact surface 635, a part of which overlaps the flange 53 when viewed from the +Z direction, may be the contact surface 635 disposed in the +Y direction. Parts of the contact surfaces 635 may overlap the flange 53. The part of the contact surface 635 overlapping the flange 53 when viewed from the +Z direction may be the entire contact surface 635 in the +Y direction. That is, at least a part of the contact surface 635 disposed in a movable direction of the holding member 61 with respect to the supporting member 64 (the ±Y direction) only has to overlap the flange 53.

Grease, lubricant, or the like may be interposed between the contact surface 635 and the guide surface 645. That is, the contact surface 635 and the guide surface 645 may not be in direct contact with some member being interposed between the contact surface 635 and the guide surface 645.

In the embodiment, the contact surface 635 is provided on the emission side of the image light by the projection optical device 5 (in the +Z direction) with respect to the holding section 62A that holds the flange 53 in the holding member 61. In other words, the contact surface 635 is provided in the incident direction of the image light on the projection optical device 5 (the +Z direction) with respect to the holding section 62A. However, not only this, but the contact surface 635 may be provided on the incident side of the image light by the projection optical device 5 (in the −Z direction) with respect to the holding section 62A.

In the embodiment, the holding member 61 includes the guide holes 636 having the major diameter in the +Y direction and the supporting member 64 includes the bosses 646 inserted into the guide holes 636. However, not only this, but the guide holes 636 and the bosses 646 may be absent if relative movement of the holding member 61 with respect to the supporting member 64 can be guided. The number of the guide holes 636 provided in the holding member 61 and the number of the bosses 646 provided in the supporting member 64 can be changed as appropriate.

Further, the holding member 61 may include, instead of the guide holes 636, one of guide grooves extending in the +Y direction and guide protrusions slidable along the guide grooves. The supporting member 64 may include, instead of the bosses 646, the other of the guides groove and the guide protrusions.

In the embodiment, the guide holes 636 include the first guide hole 637 and the second guide hole 638 provided to be separated from each other in the +X direction. The bosses 646 include the first boss 647 inserted into the first guide hole 637 and the second boss 648 inserted into the second guide hole 638. However, not only this, but one guide hole and one boss may be provided if a turn centering on the boss of the other member with respect to one member of the holding member 61 and the supporting member 64 can be suppressed.

The moving device 6 may include a plurality of guide holes separated from one another in the +Y direction and a plurality of bosses inserted into the guide holes.

In the embodiment, the inner diameter in the +X direction of the first guide hole 637 substantially coincides with the outer diameter in the +X direction in the first boss 647. The inner diameter in the +X direction in the second guide hole 638 is larger than the outer diameter in the +X direction in the second boss 648. However, not only this, but the inner diameter of the guide holes and the outer diameter of the bosses do not matter if the bosses can be inserted into the guide holes.

The first guide hole 637 and the first boss 647 are disposed in the +X direction in the moving device 6. The second guide hole 638 and the second boss 648 are disposed in the −X direction in the moving device 6. However, not only this, but the first guide hole 637 and the first boss 647 may be disposed in the −X direction in the moving device 6 and the second guide hole 638 and the second boss 648 may be disposed in the +X direction in the moving device 6. That is, in the moving device 6, the positions of the guide holes 636 and the positions of the bosses 646 do not matter.

In the embodiment, the moving device 6 includes the first interposed member 671R that is provided in the first boss 647 and is in contact with the holding member 61 and the first urging member 672R that is provided in the first boss 647 and presses and urges the holding member 61 to the supporting member 64 via the first interposed member 671R. However, not only this, but a component that urges the holding member 61 to the supporting member 64 is not limited to a component including the first interposed member 671R and the first urging member 672R. The component in which the first interposed member 671R and the first urging member 672R are provided is not limited to the first boss 647 and may be another component.

In the embodiment, the first boss 647 includes the expanded diameter section 6471 disposed on the inside of the first guide hole 637, both the ends in the +X direction of the expanded diameter section 6471 in the +X direction being formed in the arcuate shape when viewed from the +Z direction. However, not only this, but the expanded diameter section 6471 may be absent. The shape of both the ends of the expanded diameter section 6471 in the +X direction may not be the arcuate shape centering on the center of the expanded diameter section 6471 when viewed from the +Z direction or may be, for example, a linear shape.

In the embodiment, the first boss 647 includes the reduced diameter section 6472 having the outer diameter smaller than the outer diameter of the extended diameter section 6471 and projecting from the expanded diameter section 6471. Both the ends in the +X direction in the reduced diameter section 6472 are formed in the linear shape in the +Y direction when viewed from the +Z direction. However, the reduced diameter section 6472 may be absent. The shape of both the ends in the +X direction in the reduced diameter section 6472 may be another shape such as an arcuate shape.

The first interposed member 671R includes the insertion hole 6711 formed in the shape corresponding to the external shape of the reduced diameter section 6472 when viewed from the +Z direction. The reduced diameter section 6472 is inserted through the insertion hole 6711. However, not only this, but the shape of the insertion hole 6711 viewed from the +Z direction may be another shape.

In the embodiment, the moving device 6 includes the second interposed member 671L that is provided in the second boss 648 and is in contact the holding member 61 and the second urging member 672L that is provided in the second boss 648 and presses and urges the holding member 61 to the supporting member 64 via the second interposed member 671L. However, not only this, but a component that urges the holding member 61 to the supporting member 64 is not limited to a component including the second interposed member 671L and the second urging member 672L. The component in which the second interposed member 671L and the second urging member 672L are provided is not limited to the first boss 647 and may be another component. Further, the urging member 672 is not limited to the compression coil spring and may be another spring or may be an elastic body.

In the embodiment, the first bosses 647 are provided in the position in the +X direction and the +Y direction and the position in the +X direction and the −Y direction in the front surface section 64A of the supporting member 64. The second bosses 648 are provided in the position in the −X direction and the +Y direction and the position in the −X direction and the −Y direction in the front surface section 64A of the supporting member 64. That is, the plurality of first bosses 647 are provided to be separated from each other in the +Y direction and the plurality of second bosses 648 separated from the first bosses 647 in the +X direction are provided to be separated from each other in the +Y direction. However, not only this, but, the disposition and the number of the first bosses 647 and the second bosses 648 can be changed as appropriate.

In the embodiment, the first interposed member 671R and the first urging member 672R are provided in each of the plurality of first bosses 647 and the second interposed member 671L and the second urging member 672L are provided in each of the plurality of second bosses 648. However, not only this, but the first interposed member 671R and the first urging member 672R may be provided in the first boss 647 selected out of the plurality of first bosses 647. The second interposed member 671L and the second urging member 672L are the same.

In the embodiment, the guide surfaces 645 include the first guide surface 645R and the second guide surface 645L provided to be separated from each other in the +X direction. The contact surfaces 635 include the first contact surface 635R that is in contact with the first guide surface 645R and the second contact surface 635L that is in contact with the second guide surface 645L. The first boss 647 is provided on the first guide surface 645R of the first guide surface 645R and the first contact surface 635R. The second boss 648 is provided on the second guide surface 645L of the second guide surface 645L and the second contact surface 635L. However, not only this, but the guide surfaces 645 and the first boss 647 and the second boss 648 may be provided to be separated from each other.

The first boss 647 may be provided on the first contact surface 635R and the second boss 648 may be provided on the second contact surface 635L. In this case, the supporting member 64 may include the guide holes 636 to correspond to the bosses 647 and 648. That is, in the embodiment, the guide holes 636 are provided in the holding member 61 and the bosses 646 are provided in the supporting member 64. However, not only this, but the supporting member may include the guide holes and the holding member may include the bosses inserted into the guide holes.

In the embodiment, the guide holes 636 are provided on the contact surfaces 635 and the bosses 646 are provided on the guide surfaces 645. However, not only this, but the contact surfaces 635 and the guide holes 636 may be separately provided. The guide surfaces 645 and the bosses 646 may be separately provided.

In the embodiment, the projector 1 includes the three light modulation devices 353R, 353G, and 353B. However, not only this, but the present disclosure is applicable to a projector including two or less or four or more light modulation devices as well.

In the embodiment, a layout shown in FIG. 2 is illustrated as a layout of the image projection device 3. However, not only this, but the layout of the image projection device 3 can be changed as appropriate.

In the embodiment, the light modulation device 353 is the transmissive liquid crystal panel that emits the modulated light in the light incident direction. However, not only this, but the light modulation device may be a reflective liquid crystal panel that emits the modulated light in the opposite direction of the light incident direction. A light modulation device other than liquid crystal such as a device using a micromirror, for example, a device using a DMD (Digital Micromirror Device) or the like may be used if the light modulation device is capable of modulating incident light.

Overview of the Present Disclosure

An overview of the present disclosure is noted below.

A projector according to an aspect of the present disclosure includes: a projection optical device configured to project image light; and a moving device configured to move the projection optical device in a first direction crossing an incident direction of the image light on the projection optical device. The moving device includes: a holding member configured to hold the projection optical device; and a supporting member configured to support the holding member to be movable in the first direction. The projection optical device includes: a lens barrel configured to hold a lens; and a flange provided in the lens barrel and held by the holding member. The supporting member includes guide surfaces that guide the movement of the holding member in the first direction. The holding member includes contact surfaces that are in contact with the guide surfaces. The guide surfaces and the contact surfaces cross the incident direction. When viewed from an emission side of the image light by the projection optical device, at least parts of the contact surfaces overlap the flange.

With such a configuration, when viewed from the emission side of the image light by the projection optical device, at least parts of the contact surfaces included in the holding member overlap the flange held by the holding member. Consequently, compared with when the contact surfaces do not overlap the flange when viewed from the emission side of the image light by the projection optical device, the dimension of the moving device in the first direction can be reduced.

It is conceivable to reduce the dimension of the flange in the first direction such that at least parts of the contact surfaces do not overlap the flange when viewed from the emission side of the image light by the projection optical device. However, in this case, since a contact range of the holding member and the flange decreases, it is likely that the projection optical device tilts with respect to the holding member and the image light projected by the projection optical device is deteriorated. In contrast, with the configuration explained above, it is unnecessary to reduce the dimension of the flange in the first direction.

Therefore, it is possible to prevent the projected image light from being deteriorated while achieving a reduction in the size of the projector.

In the aspect, the holding member may include a holding section configured to hold the flange, and the contact surfaces may be provided on the emission side of the image light by the projection optical device with respect to the holding section.

With such a configuration, the holding section and the contact surfaces are disposed to be separated from each other in the incident direction of the image light on the projection optical device. Consequently, it is possible to make it easy to dispose the contact surfaces in positions overlapping the flange held by the holding section when viewed from the emission side of the image light. Therefore, it is possible to make it easy to achieve a reduction in the size of the projector and prevention of deterioration in the image light.

In the aspect, one member of the supporting member and the holding member may include guide holes having a major diameter in the first direction, and another member of the supporting member and the holding member may include bosses inserted into the guide holes.

With such a configuration, when the holding member relatively moves in the first direction with respect to the supporting member, the bosses relatively moves along the guide holes. Consequently, it is possible to accurately move the holding member in the first direction.

In the aspect, the guide holes may include a first guide hole and a second guide hole provided to be separated from each other in a second direction crossing each of the incident direction and the first direction, and the bosses may include a first boss inserted into the first guide hole and a second boss inserted into the second guide hole.

With such a configuration, the movement of the holding member in the first direction is guided by the first boss inserted into the first guide hole and the second boss inserted into the second guide hole separated from the first guide hole in the second direction. Therefore, it is possible to stably move the holding member and the projection optical device in the first direction.

In the aspect, an inner diameter in the second direction in the first guide hole may substantially coincide with an outer diameter in the second direction in the first boss, and an inner diameter in the second direction in the second guide hole may be larger than an outer diameter in the second direction in the second boss.

With such a configuration, since the inner diameter in the second direction in the first guide hole substantially coincides with the outer diameter in the second direction in the first boss, it is possible to accurately move the holding member in the first direction. Even when tolerance occurs between the first guide hole and the second guide hole in the second direction and when tolerance occurs between the first boss and the second boss in the second direction, the first boss can be inserted into the first guide hole and the second boss can be inserted into the second guide hole. Therefore, it is possible to improve assemblability of the holding member to the supporting member.

In the aspect, the projector may further include: a first interposed member provided in the first boss and configured to be in contact with the one member; and a first urging member provided in the first boss and configured to press and urge the one member to the other member via the first interposed member, the first boss may include: an expanded diameter section disposed on an inside of the first guide hole, both ends of the expanded diameter section in the second direction being formed in an arcuate shape when viewed from a projecting direction of the first boss; and a reduced diameter section having an outer diameter smaller than an outer diameter of the expanded diameter section and projecting from the expanded diameter section, both ends of the reduced diameter section in the second direction being formed in a linear shape in the first direction when viewed from the projecting direction of the first boss, and the first interposed member may include an insertion hole formed in a shape corresponding to an external shape of the reduced diameter section when viewed from the projecting direction of the first boss, the reduced diameter section being inserted through the insertion hole.

With such a configuration, since the first boss includes the expanded diameter section and the reduced diameter section, it is possible to make it easy to form the first boss such that the dimension in the second direction in the expanded diameter section inserted into the first guide hole substantially coincides with the inner diameter in the second direction in the first guide hole.

Since the first urging member presses and urges the one member to the other member via the first interposed member, it is possible to prevent the holding member from tilting with respect to the supporting member and prevent the projection optical device from tilting with respect to the supporting member. At this time, since the first interposed member includes the insertion hole formed in the shape described above, it is possible to prevent the first interposed member from being rotated centering on an axis extending in the projecting direction of the first boss. Therefore, it is possible to make it easy to cause a pressing force of the first urging member to act on the one member via the first interposed member.

In the aspect, the projector may further include: a second interposed member provided in the second boss and configured to be in contact with the one member; and a second urging member provided in the second boss and configured to press and urge the one member to the other member via the second interposed member.

With such a configuration, the one member is urged to the other member by the first urging member and the second urging member separated from the first urging member in the second direction. Consequently, it is possible to prevent the holding member and the projection optical device from tilting with respect to the supporting member.

In the aspect, a plurality of the first bosses may be provided to be separated from one another in the first direction, a plurality of the second bosses may be provided to be separated from one another in the first direction, the first interposed member and the first urging member may be provided in each of the plurality of first bosses, and the second interposed member and the second urging member may be provided in each of the plurality of second bosses.

With such a configuration, the one member can be urged to the other member by the first urging members provided in the first bosses and the second urging members provided in the second bosses. Consequently, it is possible to prevent the holding member and the projection optical device from tilting with respect to the supporting member. Therefore, it is possible to stably move the holding member in the first direction along the supporting member.

In the aspect, the guide surfaces may include a first guide surface and a second guide surface provided to be separated from each other in the second direction, the contact surfaces may include a first contact surface in contact with the first guide surface and a second contact surface in contact with the second guide surface, the first boss may be provided on one surface of the first guide surface and the first contact surface, and the second boss may be provided on one surface of the second guide surface and the second contact surface.

With such a configuration, it is possible to simplify a configuration of, of the holding member and the supporting member, the member including the first boss and the second boss.

When the first interposed member and the first urging member are provided in the first boss and the second interposed member and the second urging member are provided in the second boss, of the guide surface and the contact surface, the other surface can be pressed against one surface. Therefore, it is possible to improve sliding stability of the holding member with respect to the supporting member.

In the aspect, the one member may be the holding member, the other member may be the supporting member, the guide holes may be provided in the holding member, and the bosses may be provided in the supporting member.

With such a configuration, since the bosses provided in the supporting member are inserted into the guide holes provided in the holding member, it is possible to stably move the holding member with respect to the supporting member. Besides, the supporting member can stably support the holding member.

In the aspect, the guide holes may be provided on the contact surfaces, and the bosses may be provided on the guide surfaces.

With such a configuration, by inserting the bosses into the guide holes, it is possible to surely bring the guide surfaces and the contact surfaces into contact. Since the guide holes are provided on the contact surfaces and the bosses are provided on the guide surfaces, compared with when each of the contact surfaces and the guide holes are separately provided and each of the guide surfaces and the bosses are separately provided, it is possible to reduce the moving device and the projector in size.

What is claimed is:

1. A projector comprising:
   a projection optical device configured to project image light; and a moving device configured to move the projection optical device in a first direction crossing an incident direction of the image light on the projection optical device, wherein:

the moving device includes:

a holding member configured to hold the projection optical device; and a supporting member configured to support the holding member to be movable in the first direction, the projection optical device includes:

a lens barrel configured to hold a lens; and a flange provided in the lens barrel and held by the holding member, the supporting member includes guide surfaces that guide the movement of the holding member in the first direction, the guide surfaces each being a separate flat rectangular-shape surface orthogonal to the incident direction of the image light, the guide surfaces being provided at respective corner areas outside an opening that is provided on the supporting member for receiving the holding member, the holding member includes contact surfaces that are in contact with the guide surfaces, the guide surfaces and the contact surfaces cross the incident direction, and when viewed from an emission side of the image light by the projection optical device, at least parts of the contact surfaces overlap the flange.

2. The projector according to claim 1, wherein the holding member includes a holding section configured to hold the flange, and the contact surfaces are provided on the emission side of the image light by the projection optical device with respect to the holding section.

3. The projector according to claim 1, wherein one member of the supporting member and the holding member includes guide holes having a major diameter in the first direction, and another member of the supporting member and the holding member includes bosses inserted into the guide holes.

4. The projector according to claim 3, wherein the guide holes include a first guide hole and a second guide hole provided to be separated from each other in a second direction crossing each of the incident direction and the first direction, and the bosses include:

a first boss inserted into the first guide hole; and a second boss inserted into the second guide hole.

5. The projector according to claim 4, wherein an inner diameter in the second direction in the first guide hole substantially coincides with an outer diameter in the second direction in the first boss, and an inner diameter in the second direction in the second guide hole is larger than an outer diameter in the second direction in the second boss.

6. The projector according to claim 5, further comprising:

a first interposed member provided in the first boss and configured to be in contact with the one member; and a first urging member provided in the first boss and configured to press and urge the one member to the other member via the first interposed member, wherein the first boss includes:

an expanded diameter section disposed on an inside of the first guide hole, both ends of the expanded diameter section in the second direction being formed in an arcuate shape when viewed from a projecting direction of the first boss; and a reduced diameter section having an outer diameter smaller than an outer diameter of the expanded diameter section and projecting from the expanded diameter section, both ends of the reduced diameter section in the second direction being formed in a linear shape in the first direction when viewed from the projecting direction of the first boss, and the first interposed member includes an insertion hole formed in a shape corresponding to an external shape of the reduced diameter section when viewed from the projecting direction of the first boss, the reduced diameter section being inserted through the insertion hole.

7. The projector according to claim 6, further comprising:

a second interposed member provided in the second boss and configured to be in contact with the one member; and a second urging member provided in the second boss and configured to press and urge the one member to the other member via the second interposed member.

8. The projector according to claim 7, wherein a plurality of the first bosses are provided to be separated from one another in the first direction, a plurality of the second bosses are provided to be separated from one another in the first direction, the first interposed member and the first urging member are provided in each of the plurality of first bosses, and the second interposed member and the second urging member are provided in each of the plurality of second bosses.

9. The projector according to claim 4, wherein the guide surfaces include a first guide surface and a second guide surface provided to be separated from each other in the second direction, the contact surfaces include:

a first contact surface that is in contact with the first guide surface; and a second contact surface that is in contact with the second guide surface, the first boss is provided on one surface of the first guide surface and the first contact surface, and the second boss is provided on one surface of the second guide surface and the second contact surface.

10. The projector according to claim 3, wherein the one member is the holding member, the other member is the supporting member, the guide holes are provided in the holding member, and the bosses are provided in the supporting member.

11. The projector according to claim 10, wherein the guide holes are provided on the contact surfaces, and the bosses are provided on the guide surfaces.

12. A projector comprising:

a projection optical device configured to project image light; and a moving device configured to move the projection optical device in a first direction crossing an incident direction of the image light on the projection optical device, wherein:

the moving device includes:

a holding member configured to hold the projection optical device; and a supporting member configured to support the holding member to be movable in the first direction, the projection optical device includes:

a lens barrel configured to hold a lens; and a flange provided in the lens barrel and held by the holding member, the supporting member includes guide surfaces that guide the movement of the holding member in the first direction, the holding member includes contact surfaces that are in contact with the guide surfaces, the guide surfaces and the contact surfaces cross the incident direction, when viewed from an emission side of the image light by the projection optical device, at least parts of the contact surfaces overlap the flange, one member of the supporting member and the holding member includes guide holes having a major diameter in the first direction, and another member of the supporting member and the holding member includes bosses inserted into the guide holes.

13. The projector according to claim 12, wherein the guide holes include a first guide hole and a second guide hole provided to be separated from each other in a second direction crossing each of the incident direction and the first direction, and the bosses include:
   a first boss inserted into the first guide hole; and
   a second boss inserted into the second guide hole.

14. The projector according to claim 13, wherein an inner diameter in the second direction in the first guide hole substantially coincides with an outer diameter in the second direction in the first boss, and an inner diameter in the second direction in the second guide hole is larger than an outer diameter in the second direction in the second boss.

* * * * *